US005556011A

United States Patent [19]

Jennings et al.

[11] Patent Number: 5,556,011
[45] Date of Patent: Sep. 17, 1996

[54] MEASURING CONTAINER

[76] Inventors: Robert M. Jennings, 4 Curtis Trail, Martinsville, N.J. 08836; David A. Jennings, 28 Bayberry La., Mountainside, N.J. 07092

[21] Appl. No.: 313,374

[22] Filed: Sep. 27, 1994

Related U.S. Application Data

[63] Continuation-in-part of Ser. No. 166,205, Dec. 13, 1993, abandoned.

[51] Int. Cl.⁶ ................................................. G01F 11/26
[52] U.S. Cl. ........................ 222/455; 222/456; 141/83; 141/325
[58] Field of Search ...................... 222/454, 455, 222/456, 457, 158, 207, 436, 475; 141/2, 18, 98, 320, 325, 326, 83; 73/426, 427, 428; 215/6; 220/23.8

[56] References Cited

U.S. PATENT DOCUMENTS

| | | | |
|---|---|---|---|
| 236,997 | 1/1881 | Dodge | 222/456 |
| 562,823 | 6/1896 | Heysinger | 141/18 |
| 570,759 | 11/1896 | Law | 222/456 |
| 697,830 | 4/1902 | Franc | 222/455 |
| 1,009,550 | 11/1911 | Moys | 222/49 |
| 1,093,740 | 4/1914 | Stevenson | 222/158 |
| 1,227,658 | 5/1917 | Prenosil | 222/424.6 |
| 1,282,103 | 10/1918 | Moffat | 222/567 |
| 1,373,535 | 4/1921 | Smith | 222/456 |
| 1,438,892 | 12/1922 | Boykin | 222/442 |
| 1,865,269 | 6/1932 | Munday | 222/473 |
| 1,924,809 | 8/1933 | Schuelke | 215/37 |
| 2,017,209 | 10/1935 | Kenney | 221/147 |
| 2,091,929 | 8/1937 | Kappenberg | 222/455 |
| 2,584,130 | 2/1952 | Huebl | 222/455 |
| 2,645,388 | 7/1953 | Hester | 222/454 |
| 2,728,490 | 12/1955 | Scannel | 222/153 |
| 2,980,297 | 4/1961 | Tucci | 222/158 |
| 3,058,633 | 10/1962 | Muhlhoff | 222/568 |
| 3,187,965 | 6/1965 | Bourget | 222/518 |
| 3,235,143 | 2/1966 | Goodrich | 222/454 |
| 3,254,809 | 6/1966 | Breneman | 222/442 |
| 3,347,420 | 10/1967 | Donoghue | 222/129 |
| 3,353,725 | 11/1967 | Caceres | 222/456 |
| 3,396,875 | 8/1968 | Finch | 222/456 |
| 3,401,840 | 9/1968 | McConnell | 222/158 |
| 3,451,446 | 6/1969 | Russell | 141/319 |
| 3,750,915 | 8/1973 | Kearney | 222/567 |
| 3,948,105 | 4/1976 | Johnson | 73/427 |
| 4,069,946 | 1/1978 | Flider | 222/1 |
| 4,079,859 | 3/1978 | Jennings | 222/1 |
| 4,298,038 | 11/1981 | Jennings | 141/2 |
| 4,418,843 | 12/1983 | Jackman | 222/158 |
| 4,432,763 | 2/1984 | Manschot | 604/262 |
| 4,646,948 | 3/1987 | Jennings | 222/454 |
| 4,860,927 | 8/1989 | Grinde | 222/158 |
| 4,893,732 | 1/1990 | Jennings | 222/109 X |
| 5,029,736 | 7/1991 | Maruyama et al. | 222/455 |
| 5,165,576 | 11/1992 | Hickerson | 222/158 |
| 5,261,575 | 11/1993 | Keller | 222/455 |

FOREIGN PATENT DOCUMENTS

| | | |
|---|---|---|
| 0402574 | 12/1990 | European Pat. Off. . |
| 3017457 | 11/1980 | Germany . |
| 439083 | 9/1966 | Switzerland . |

*Primary Examiner*—Andres Kashnikow
*Assistant Examiner*—Lisa Douglas
*Attorney, Agent, or Firm*—Ladas & Parry

[57] ABSTRACT

A container is provided for dispensing measured amounts of flowable solid material. The container includes a storage chamber, a measuring chamber having a predetermined volume and communicating with the storage chamber to be filled therefrom, and a dispensing chamber for receiving the measured volume of material from the measuring chamber while surplus material is returned to the storage chamber. A second measuring chamber may be provided to reduce the amount of the measured volume prior to dispensing.

32 Claims, 34 Drawing Sheets

FIG. 2

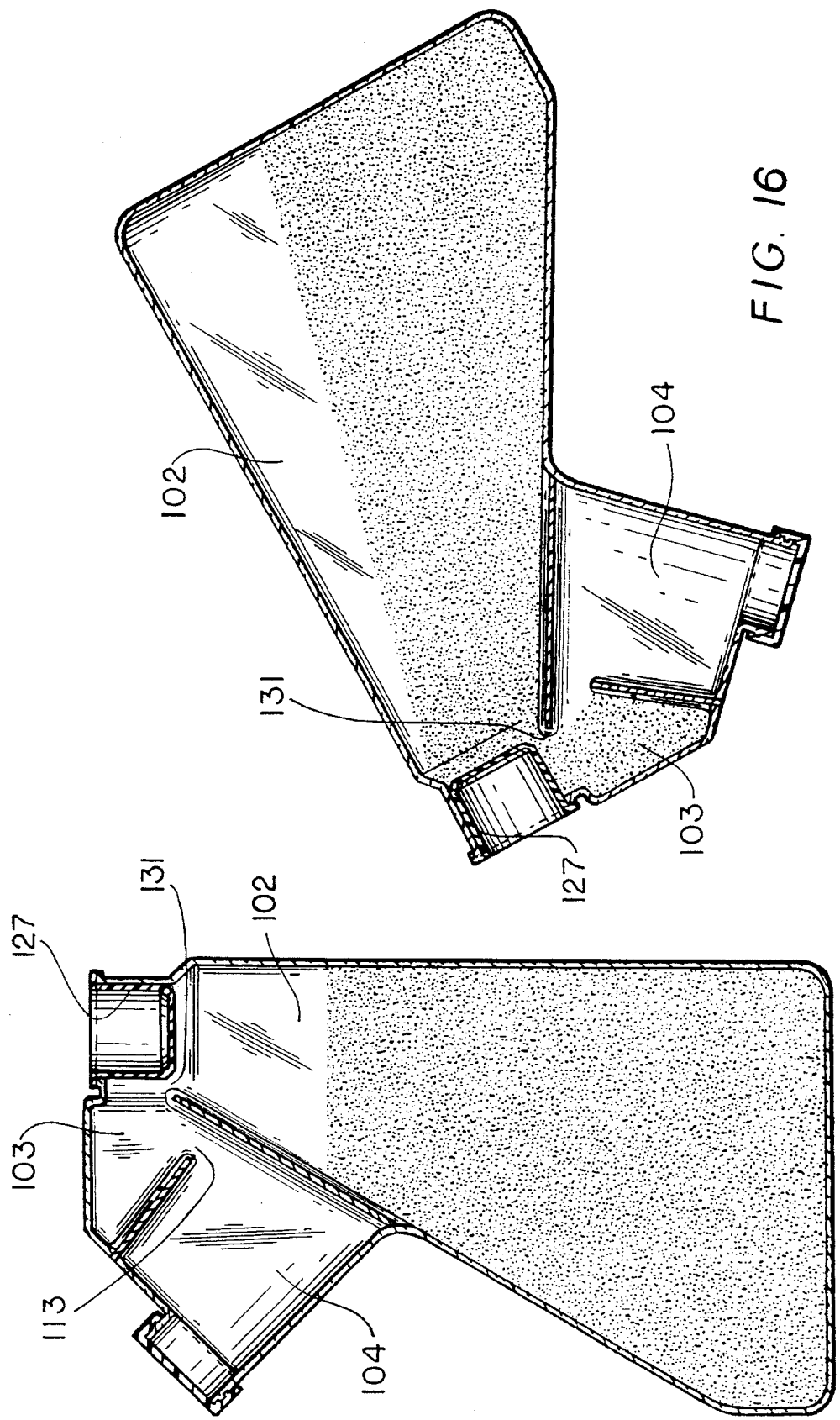

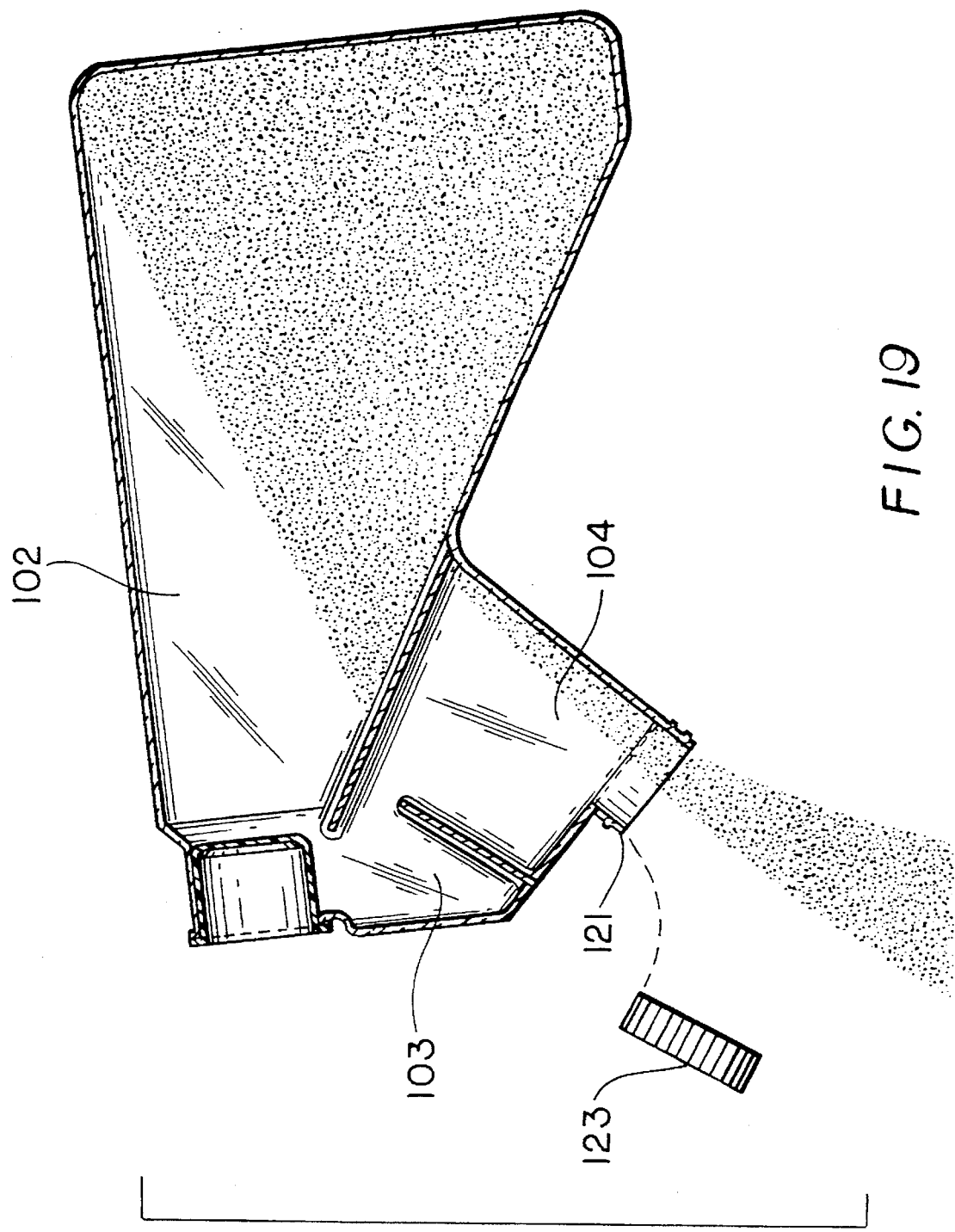

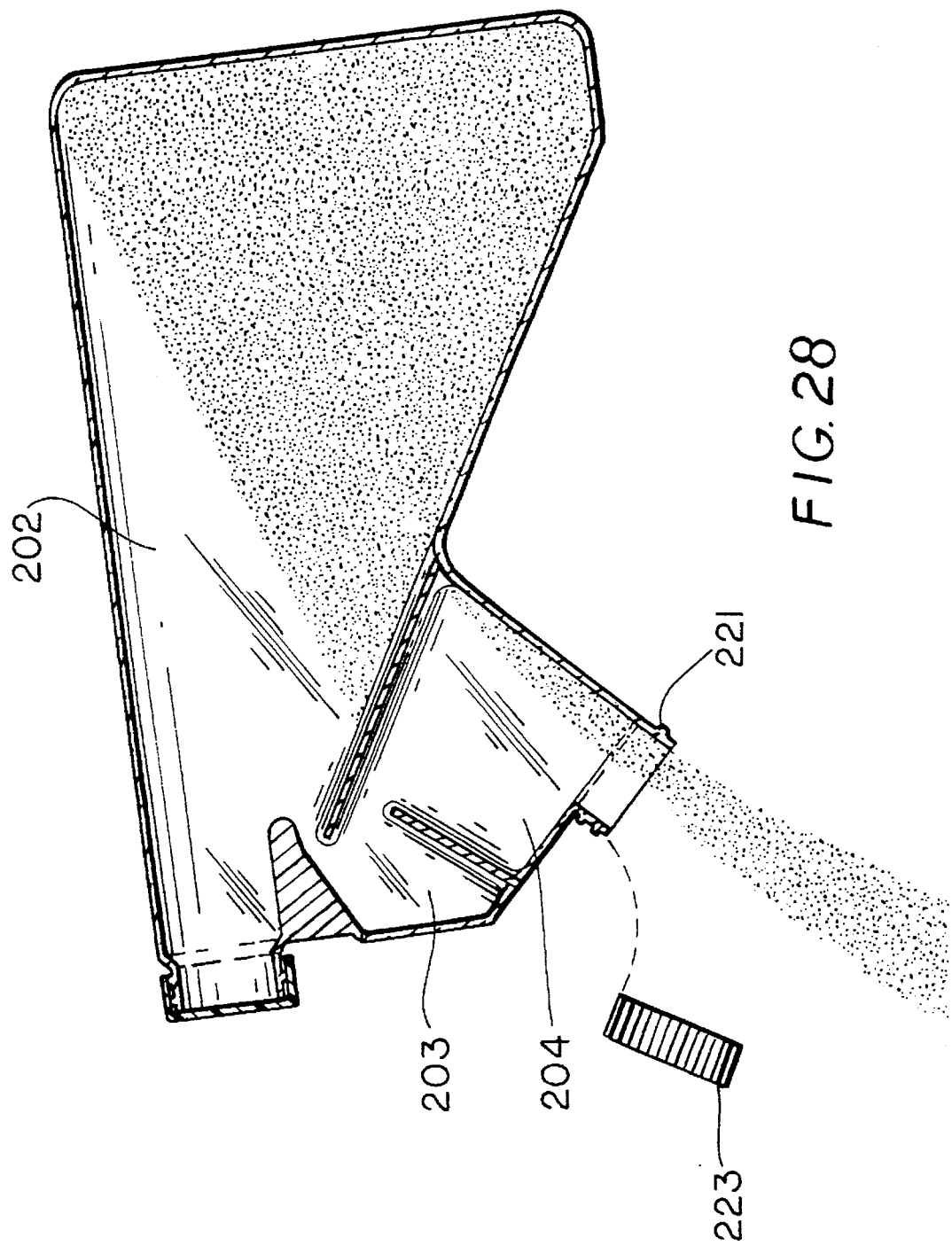

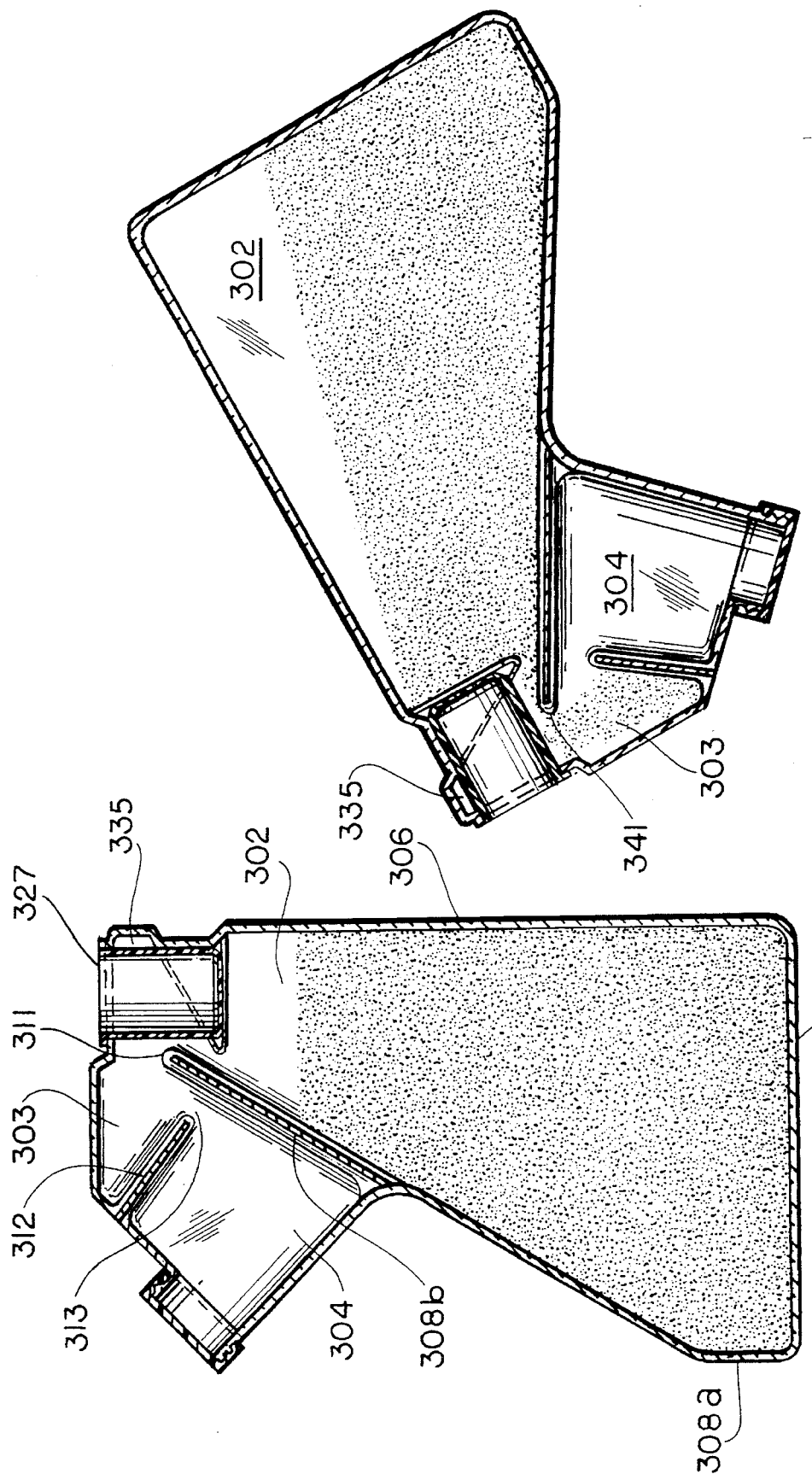

5,556,011

MEASURING CONTAINER

This is a continuation-in-part of application Ser. No. 08/166,205 filed on Dec. 13, 1993, now abandoned.

FIELD OF THE INVENTION

This invention is concerned with containers for dispensing flowable solid material. The term "flowable solid material" is utilized throughout the specification to denote solid material in discrete form. Thus, the term encompasses granular, particulate, flake, crystalline, coarse powder and other similarly constituted flowable materials. The physical characteristics of each individual material are such that each material will adopt an angle of repose which differs, or may differ, from the angle of repose of other material falling within the general category of flowable solid materials. The angle of repose is the angle adopted by the sides of a pile of flowable solid material beyond which the pile becomes unstable and material will tumble or sift down the sides rearranging the pile until stability is achieved.

BACKGROUND OF THE INVENTION

Measuring containers having a storage chamber and a measuring chamber or head with a partial barrier therebetween permitting pouring of a predetermined amount of liquid from the storage chamber to the measuring chamber for dispensing a measured amount are known. Examples of such measuring containers are disclosed in U.S. Pat. Nos. 4,646,948:4,079,859 and 4,298,038. Those measuring containers were designed for the pouring of measured amounts of liquid and would be less suitable for dispensing measured amounts of flowable solid material. It is against this background that the applicant has devised a measuring container having a specific configuration and function which is capable of first measuring and then dispensing a predetermined amount of flowable solid material.

It is thus an object of the invention to provide a container which enables a measured amount of flowable solid material to be transferred from a storage area to a location from which the measured amount can be dispensed.

It is a further object of the invention to provide a container in which the flowable solid material transferred to the dispensing location can be dispensed without further material flowing from the storage area.

It is a still further object of the present invention to provide an alternative container configuration whereby after a predetermined measured volume of material has been transferred from the storage container to the dispensing location, a predetermined portion of that measured volume can be returned to the storage container prior to dispensing the remainder of initially measured amount from the dispensing location.

According to the present invention there is provided a container for measuring and dispensing a predetermined amount of material, said container including a storage chamber, a measuring chamber and a dispensing chamber, said measuring chamber communicating with said storage chamber in such manner as to be fillable with material from said storage chamber upon tilting of said container from an initial position to a tilted position to pour material from said storage chamber into said measuring chamber, said measuring chamber having a closed bottom and being separated from said dispensing chamber by a barrier wall portion which extends from said closed bottom upwardly to a passage communicating with said dispensing chamber and which enables said measuring chamber to be completely filled substantially to the level of said passage when the container is in said tilted position, said measuring chamber having a closed bottom communicating with said dispensing chamber by way of said passage in such manner that upon reversion of the container to said initial position material will transfer from the measuring chamber to the dispensing chamber and surplus material which had not entered the measuring chamber will return to the storage chamber.

According to a further embodiment of the present invention there is provided for measuring and dispensing a predetermined amount of flowable solid material, a container including a storage chamber, a measuring chamber and a dispensing chamber, said measuring chamber communicating with said storage chamber in such manner as to be fillable with material from said storage chamber upon tilting of said container from an initial position to a tilted position to pour material from said storage chamber into said measuring chamber, said measuring chamber having a closed bottom and being separated from said dispensing chamber by a barrier wall portion which extends from said closed bottom upwardly to a passage communicating with said dispensing chamber and which enables said measuring chamber to be completely filled substantially to the level of said passage when the container is in said tilted position, said measuring chamber communicating with said dispensing chamber by way of said passage in such manner that upon reversion of the container to said initial position material will transfer from the measuring chamber to the dispensing chamber and surplus material which had not entered the measuring chamber will return to the storage chamber.

According to a further embodiment of the present invention there is provided for measuring and dispensing a predetermined amount of flowable solid material, a container including a storage chamber, a first measuring chamber, a second measuring chamber and a dispensing chamber, said first measuring chamber communicating with the storage chamber in such manner as to be fillable with material from said storage chamber upon tilting said container in a first direction from an initial position to pour material from said storage chamber into said measuring chamber, said first measuring chamber having a closed bottom and being separated from said dispensing chamber by a barrier wall portion which extends from said closed bottom upwardly to a passage communicating with said dispensing chamber and which enables said first measuring chamber to be completely filled substantially to the level of said passage when the container is tilted in said first direction, said first measuring chamber communicating with said dispensing chamber in such manner that upon reversion of the container to said initial position material will transfer from the first measuring chamber to the dispensing chamber and surplus material which had not entered the first measuring chamber will return to the storage chamber, and said second measuring chamber communicating with the dispensing chamber and being fillable therefrom upon tilting of said container in a second direction opposite to said first direction beyond the initial position to pour material from the dispensing chamber to fill the second measuring chamber, the relative dispositions of said chambers being such that when the container is again returned to the initial position, the material filling the second measuring chamber will return directly to the storage chamber and the material initially in the dispensing chamber which had not entered the second measuring chamber returns to the dispensing chamber.

According to a still further embodiment of the present invention there is provided for measuring and dispensing a predetermined amount of flowable solid material, a container including a storage chamber, a first measuring chamber, a second measuring chamber, a dispensing chamber, a filling bore extending downwardly into the storage chamber and closable by a hollow plug, said plug having an opening in a wall portion located for alignment with an opening in the bore wall to provide communication between the storage chamber and the first measuring chamber and a passage within the hollow plug extending between the opening in the wall portion thereof and an opening in the plug bottom to provide communication between the storage chamber and the aligned openings in the filling bore and the plug wall portion, said first measuring chamber communicating with the storage chamber in such manner as to be fillable with material from said storage chamber through said passage and aligned openings upon tilting said container in a first direction from an initial position to pour material from said storage chamber into said first measuring chamber, said first measuring chamber having a closed bottom and being separated from said dispensing chamber by a barrier wall portion which extends from said closed bottom upwardly to a passage communicating with said dispensing chamber and which enables said first measuring chamber to be completely filled substantially to the level of said communicating passage when the container is tilted in said first direction, said first measuring chamber communicating with said dispensing chamber in such manner that upon reversion of the container to said initial position material will transfer from the first measuring chamber to the dispensing chamber and surplus material which had not entered the first measuring chamber will return to the storage chamber, said second measuring chamber being located within the hollow plug and being fillable from the dispensing chamber upon tilting of said container in a second direction opposite to said first direction beyond the initial position to pour material from the dispensing chamber to fill the second measuring chamber, the relative dispositions of said chambers being such that when the container is again returned to the initial position, the material filling the second measuring chamber returns from the plug to the storage chamber and the material initially in the dispensing chamber which had not entered the second measuring chamber returns to said dispensing chamber.

BRIEF DESCRIPTION OF THE DRAWINGS

The invention will now be described with reference to the accompanying drawings, in which:

FIG. 15 is a sectioned elevation of the container shown in FIG. 11 partially filled with flowable solid material;

FIG. 16 is a view similar to FIG. 15 but shows the container in a position rotated in an counterclockwise direction during a first phase of operation;

FIG. 19 is a view similar to FIG. 17 but shows the container in a final phase of operation;

FIG. 28 is a view similar to FIG. 25 but shows the container in a final phase of operation;

FIG. 35 is a sectioned side elevation of the container shown in FIG. 29 shown partially filed with a flowable solid material;

FIG. 36 is a view similar to FIG. 35 but showing the container in a position rotated in an counterclockwise direction during a first phase of operation;

DESCRIPTION OF PREFERRED EMBODIMENTS

Figure 1:
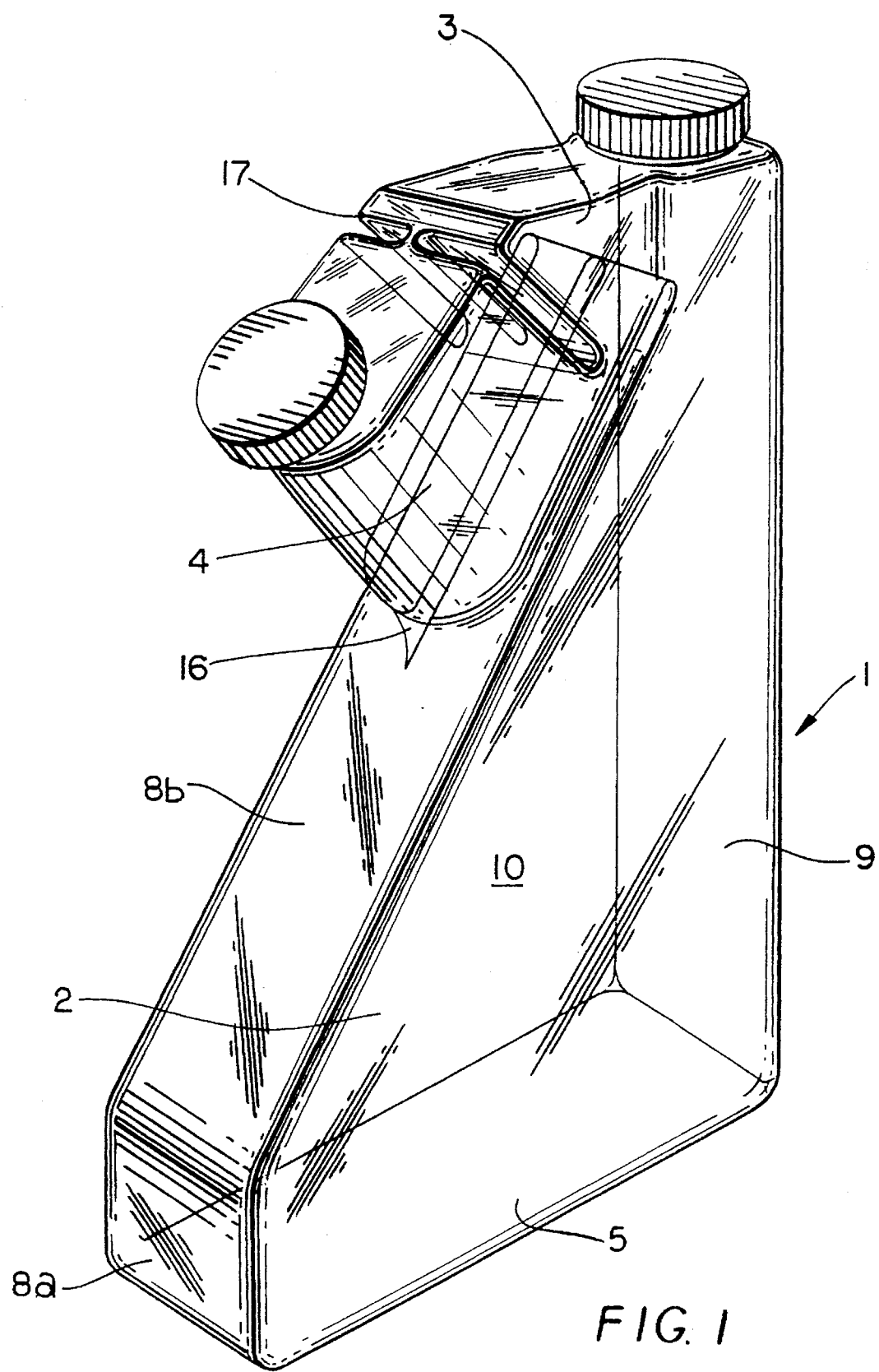
FIG. 1 is a perspective view of a first embodiment of a container of the invention shown in an upright position.
Figure 2:
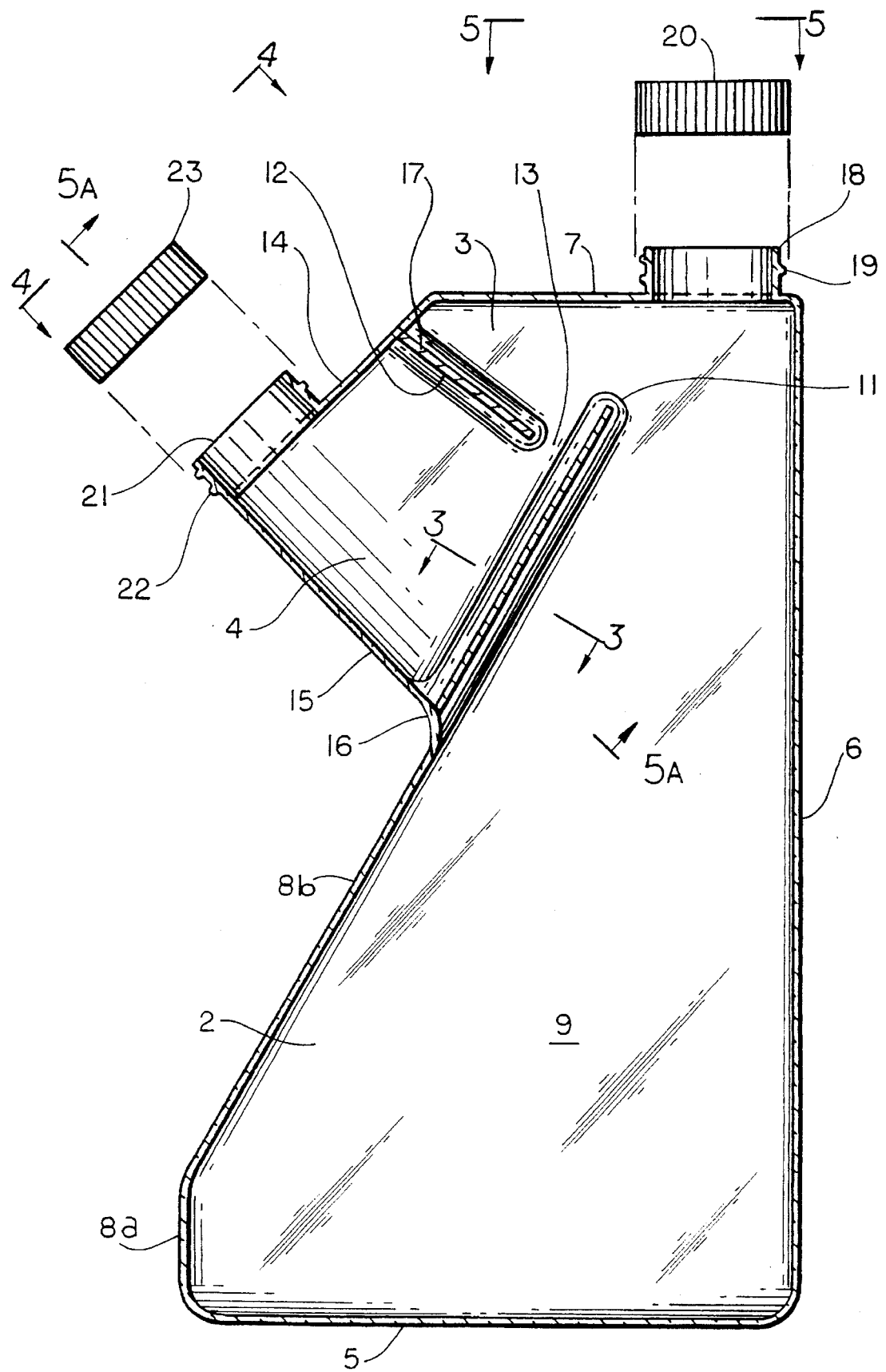
FIG. 2 is a partially exploded sectioned side elevation of the container shown in FIG. 1.
Figure 3:
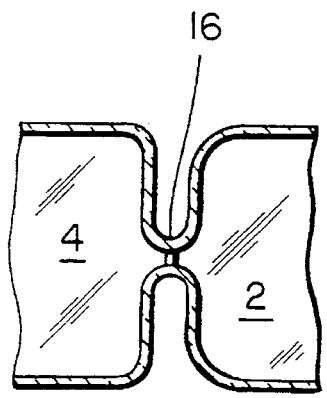
FIG. 3 is a section taken along the line 3—3 of FIG. 2.
Figure 4:
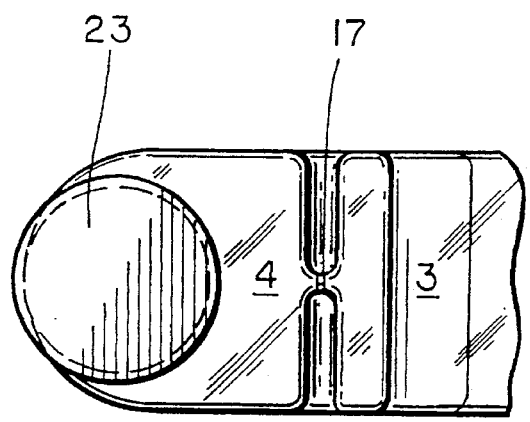
FIG. 4 is a view taken along the line 4—4 of FIG. 2.

Referring now to the drawings, the container 1 shown in FIGS. 1 through 10 comprises a storage chamber 2, a measuring chamber 3 and a dispensing chamber 4. The storage chamber 2 upstands from a base 5 and has a rear wall 6 extending upwardly from the base 5 to the top 7 of the container. A front wall of the storage chamber has a first portion 8a extending upwardly from the base 5 substantially parallel to the rear wall 6 and a second portion 8b angled rearwardly from the upper end of the first portion 8a to define a generally upwardly tapering storage chamber which is enclosed by side walls 9,10.

Figure 7:
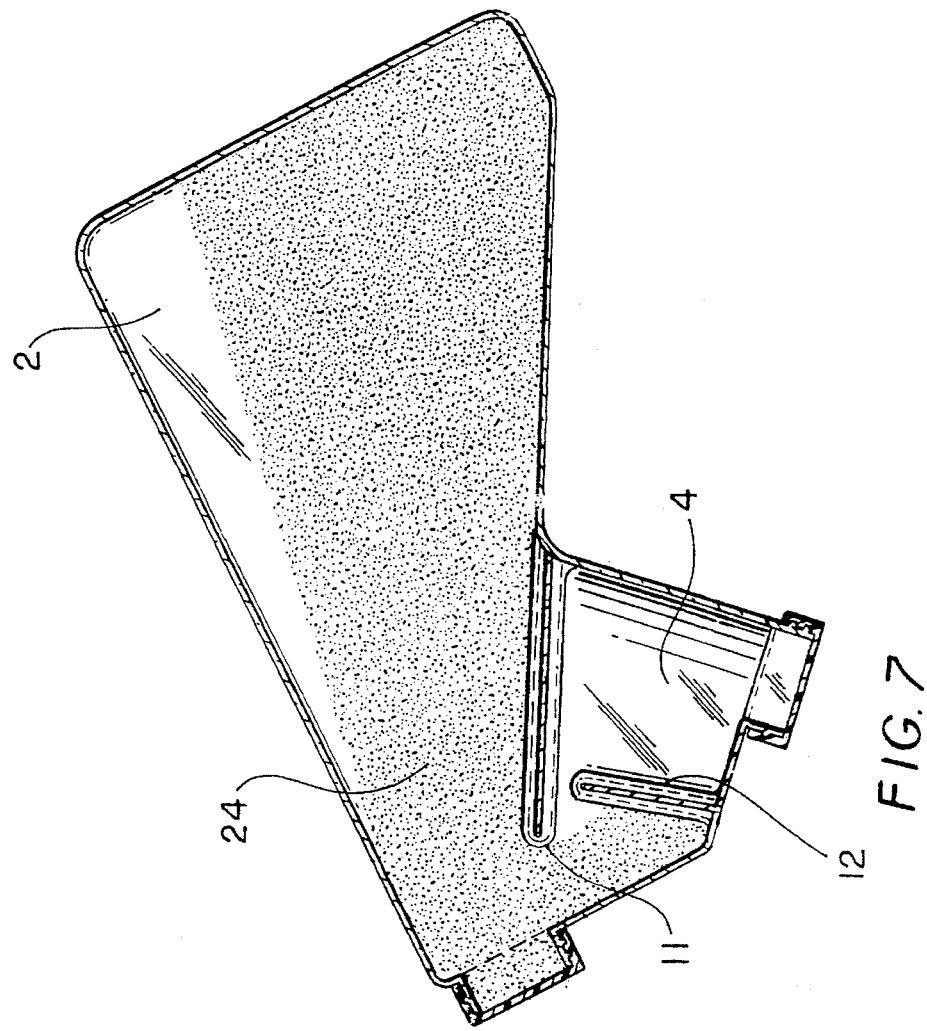
FIG. 7 is a view similar to FIG. 6 but showing the container in a position rotated in an counterclockwise direction during a first phase of operation.

The portion 8b of the front wall tapers upwardly and rearwardly and terminates short of the top 7 of the container to define a barrier providing a weir 11 over which material contained in the storage chamber 2 can be poured to fill the measuring chamber 3 when the container is rotated in a counterclockwise direction to assume the position shown in the FIG. 7 of the drawings.

The measuring chamber 3 is generally triangular in configuration and is defined, on one side, by the top wall 7 of the container and on a second side by the barrier defined by the portion 8b of the front wall. The third side of the generally triangular measuring chamber 3 extends downwardly from the forward end of the top wall 7 in the direction of the barrier front wall portion 8b of the storage chamber to provide a second barrier 12 which terminates short of the barrier front wall portion 8b to define a passage 13 providing communication between the measuring chamber 3 and the dispensing chamber 4. The barrier 12 and top wall 7 converge to provide a closed bottom of the measuring chamber 3. In the embodiment shown in FIG. 2 of the drawings, the barrier 12 is at an angle of approximately 90° with respect to the front wall portion 8b. However, depending on the angle of repose of the flowable solid material to be measured and dispensed, this angle can be 90°±15°.

Figure 5:
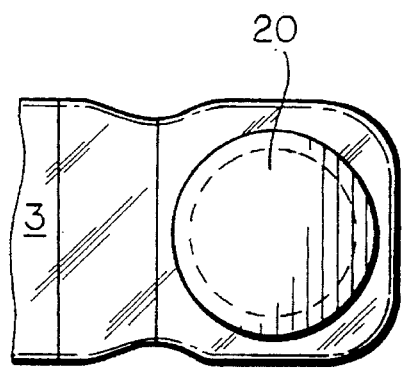
FIG. 5 is a view taken along the line 5—5 of FIG. 2.
Figure 5A:
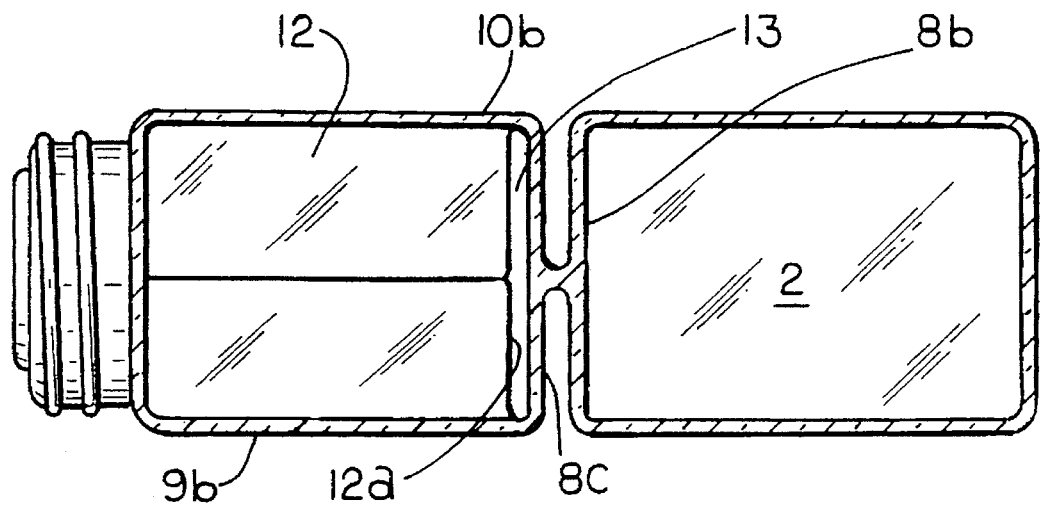
FIG. 5A is a section taken along the line 5A—5A of FIG. 2.
Figure 5B:
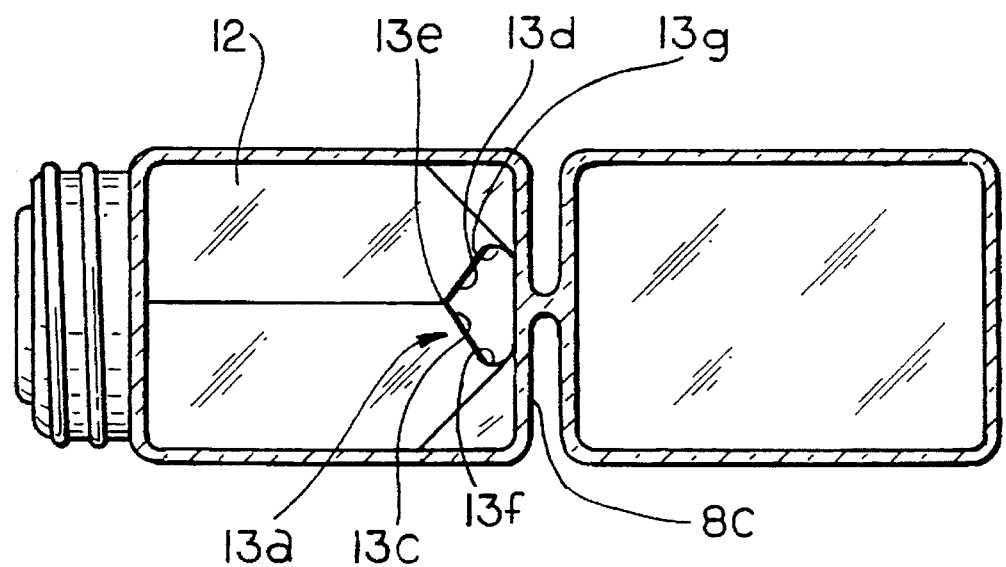
FIG. 5B is an section similar to FIG. 5A but showing an alternative embodiment.

The shape and dimensions of the passage 13 will affect the rate of flow of material therethrough from the measuring chamber to the dispensing chamber. Thus, in the case of the embodiment shown in FIG. 1, and as most clearly shown in FIG. 5A, the opening is in the form of an elongated slot 13, the long sides of which are respectively parallel by the extremity 12a of the barrier 12 and a wall portion 8c substantially provided to the front wall 8b and the short sides of the which are provided by side walls 9b and 10b. In the alternative form shown in FIG. 5B, the opening is more triangular in shape and has a height which is substantial in relation to its base. As shown in FIG. 5B, a notch 13a of generally triangular configuration is formed at the end of barrier 12 remote from the bottom of the measuring chamber 3. The notch 13a is defined by wall portions 13c, 13d diverging from an apex 13e and having downturned end margins which terminate at the wall portion 8c. The height of the passage provided by the notch may be slightly less than, equal to or greater than the width of the base of the triangle. With such a configuration the flow rate of material is altered and the dimension of the notch may be selected in accordance with the material to be measured and dispensed.

It is thus possible either to increase or decrease the flow rate of material. In general, a slowing of the flow rate will facilitate return of excess material to the storage chamber.

Both the measuring chamber 3 and the dispensing chamber 4 are located on the opposite side of the container wall portion 8b from the storage chamber 2. The dispensing chamber has an upper surface 14 and a front wall 15. The upper surface 14 lies flush with the base of the triangular measuring chamber 3 and the front wall depends substantially at right angles therefrom down to the front wall portion 8b.

In the embodiment shown in the drawings, the container is formed by molding plastics material and the storage, measuring and dispensing chambers are all integrally connected to define the container 1 with the measuring and dispensing chambers 3 and 4 being spaced from the storage chamber 2 by a web 16 and the measuring and dispensing chambers spaced from one another by a further web 17. Molded plastics material may be transparent, thereby making visible the contents of the container and, in particular, the degree to which the respective compartments are filled with material.

In order to fill the storage chamber 2 with material to be measured and dispensed, a neck 18 upstands from the top 7 of the container and is provided with external screw threads 19 to receive a mating screw threaded cap 20. In order to dispense the measured amount of material, a similar neck 21 upstands from the upper surface 14 of the dispensing chamber 4 and is provided with screw threads 22 to receive a mating screw threaded cap 23.

The operation of the above described first embodiment of a container of the invention will now be described with reference to the drawings, and particularly with reference to FIGS. 6 to 10.

With the storage chamber 2 of the container 1 containing a substantial amount of stored material 24, the following steps are performed in order firstly to measure and secondly to dispense a predetermined amount of that material. The amount to be dispensed is determined by the volume of the measuring chamber 3 and that chamber is filled by tilting the container in a counterclockwise direction to adopt the position shown in FIG. 7 in which the material is shown pouring over the weir 11 to fill the measuring chamber 3. In the schematic illustration of FIG. 7 material is still pouring over the weir and the chamber 3 is shown largely, but not totally, filled. The chamber will be filled when material occupies the total space to the left of the barrier 12 as shown in FIG. 7. The relative locations of the weir 11 and the top of the barrier 12 are such that due to the angle of repose (as defined in the opening paragraphs of this specification) of the material 24, material will not flow over the top of the barrier 12 when the container is in the position shown in FIG. 7. Thus, the measuring chamber will be filled with a predetermined quantity of material subsequently to be dispensed.

Figure 6:
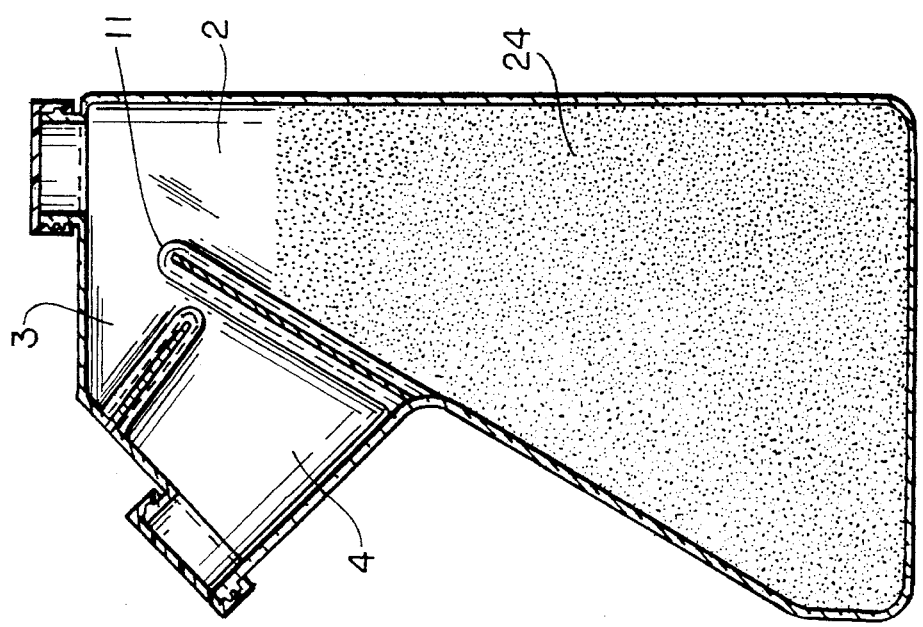
FIG. 6 is a sectioned side elevation of the embodiment shown in FIG. 1 shown filled with flowable solid material.
Figure 9:
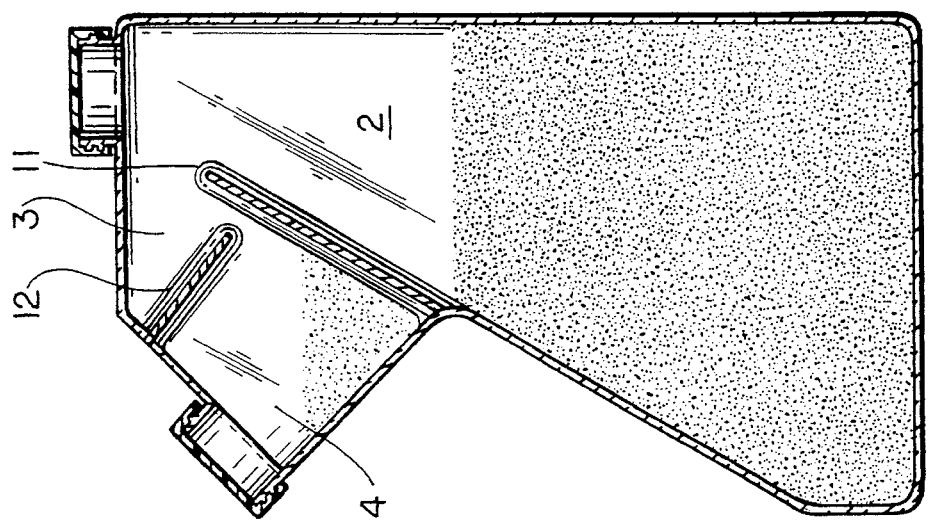
FIG. 9 is view similar to FIG. 8 but showing the container in a third phase of operation.
Figure 8:
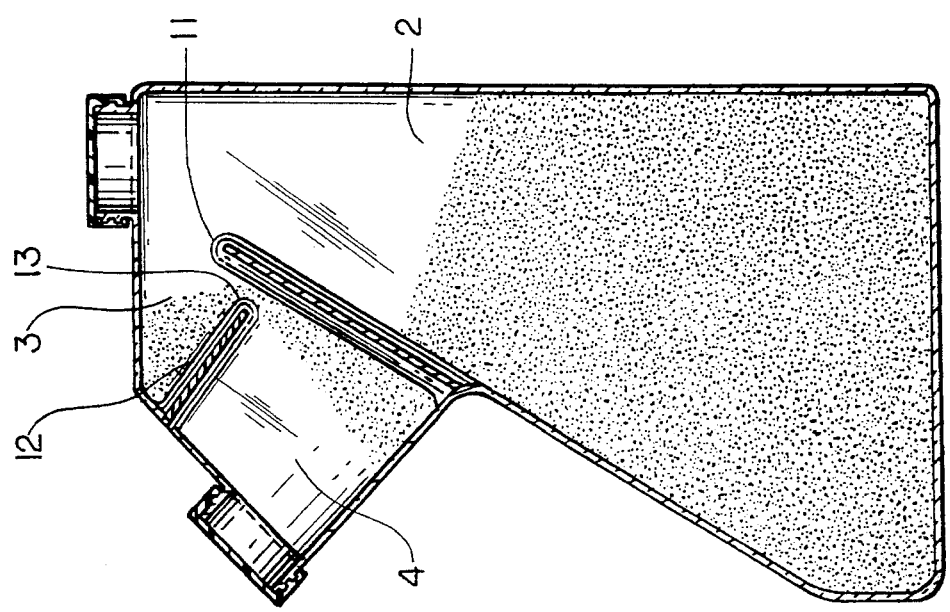
FIG. 8 is a view similar to FIG. 6 but showing the container returned to an upright position during a second phase of operation.
Figure 10:
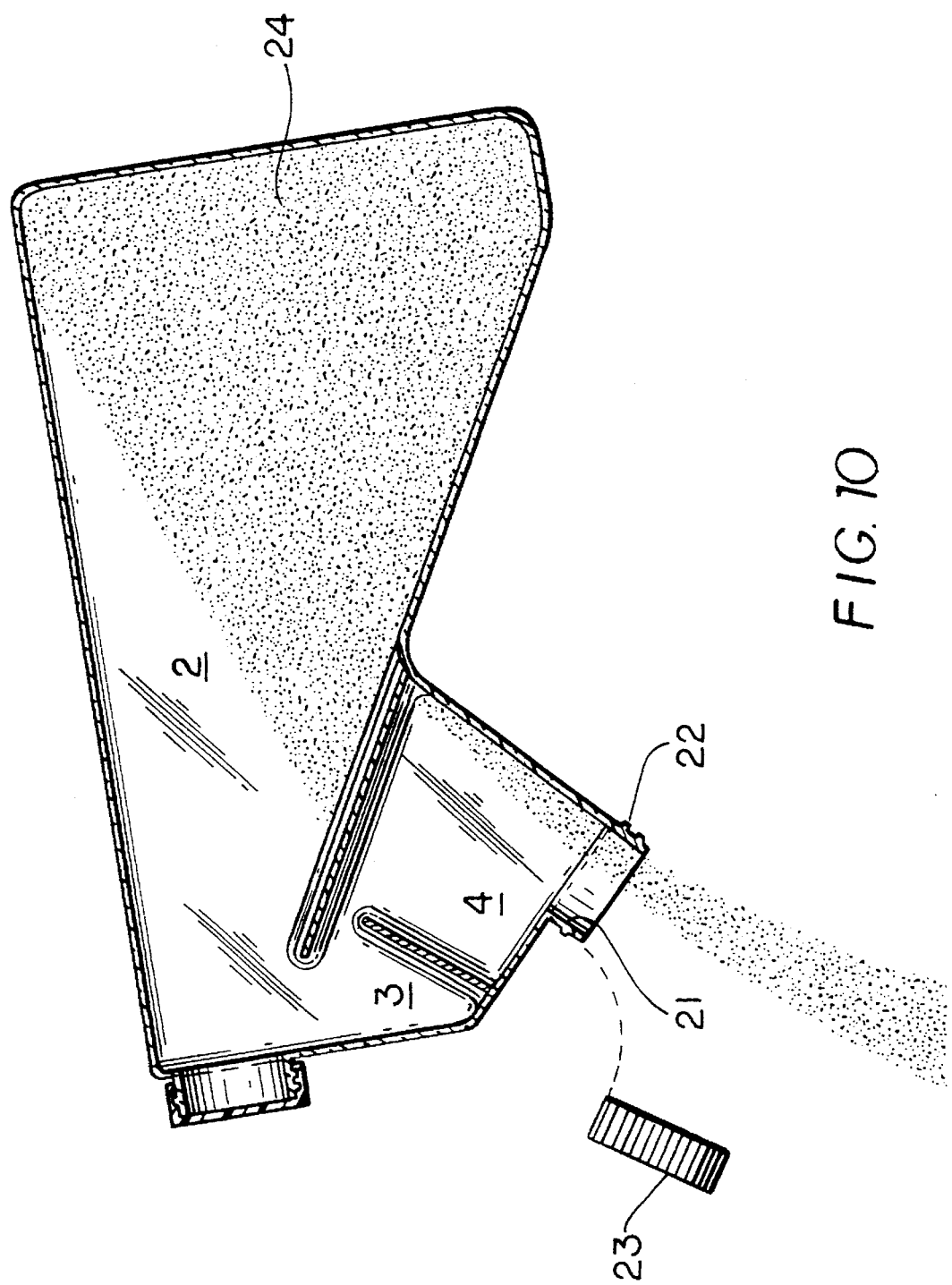
FIG. 10 is a view similar to FIG. 7 but showing the container in a final phase of operation.
Figure 11:
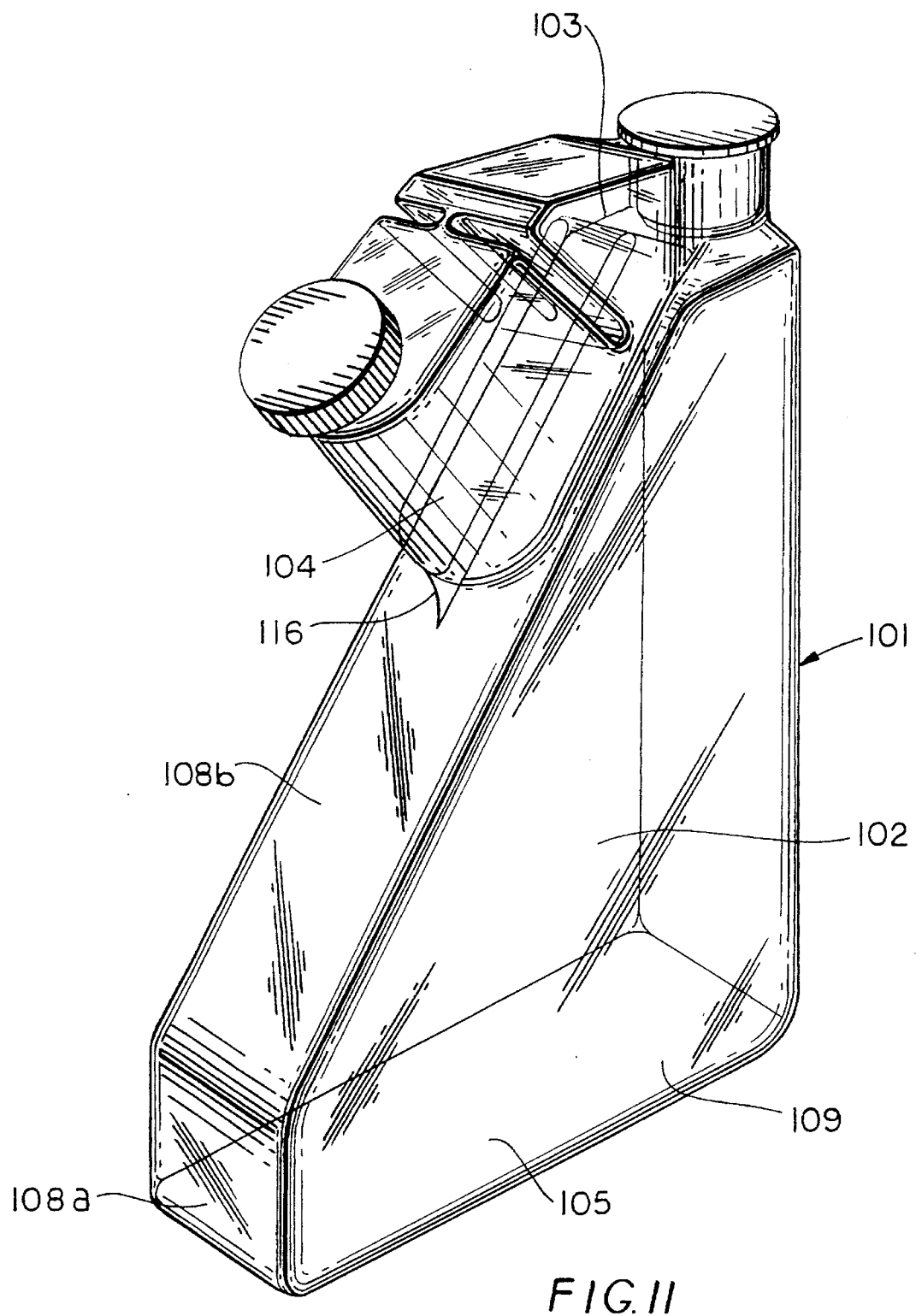
FIG. 11 is a view similar to FIG. 1 but showing a second embodiment of the invention.
Figure 12:
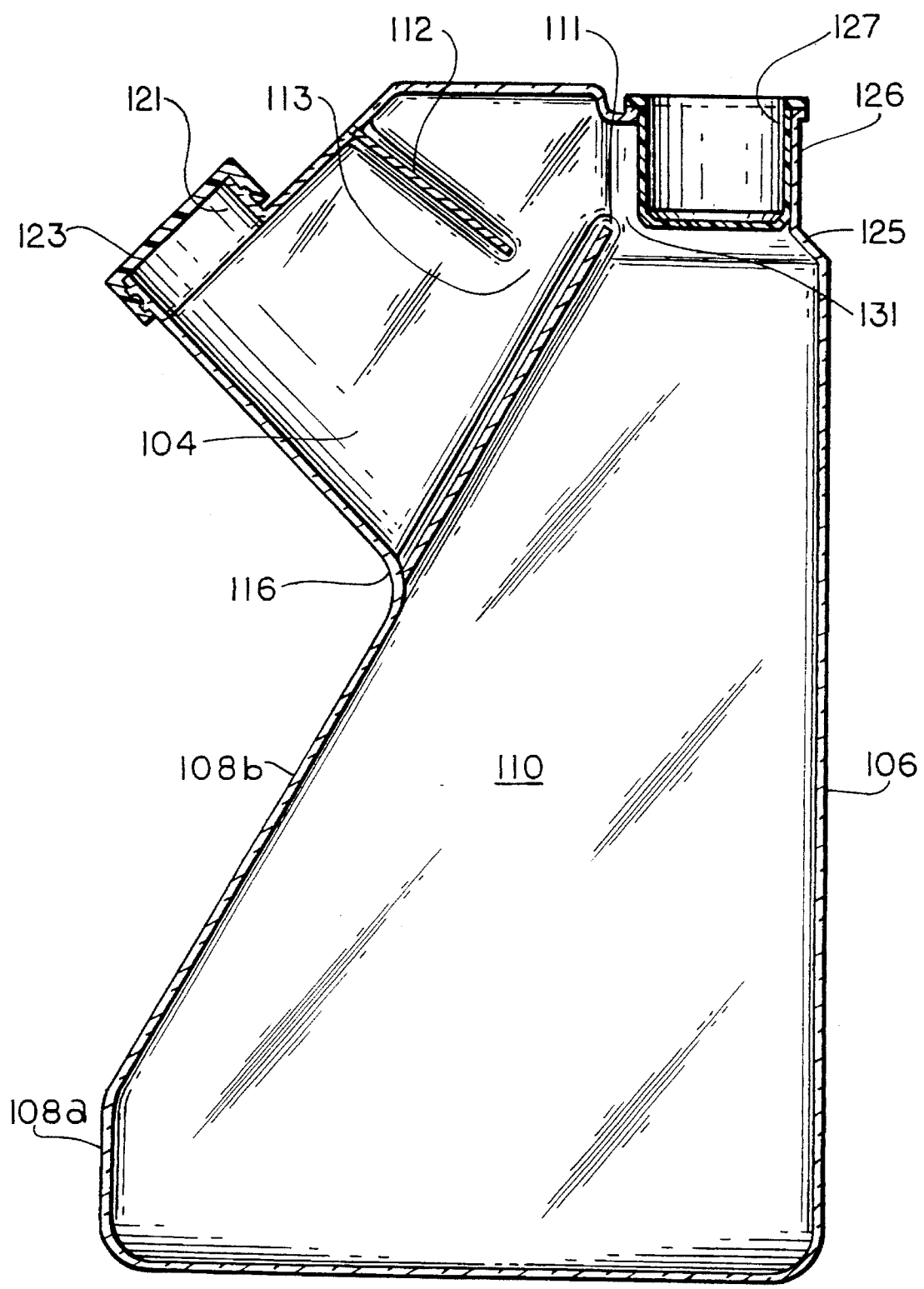
FIG. 12 is a sectioned side elevation of the container shown in FIG. 12.
Figure 14:
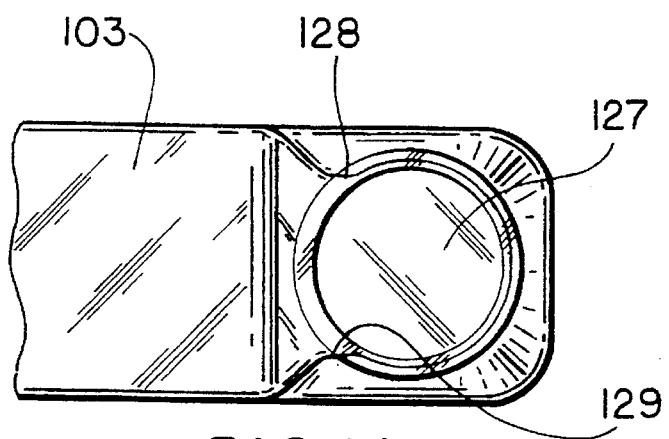
FIG. 14 is a view taken along the line 14—14 of FIG. 13.
Figure 13:
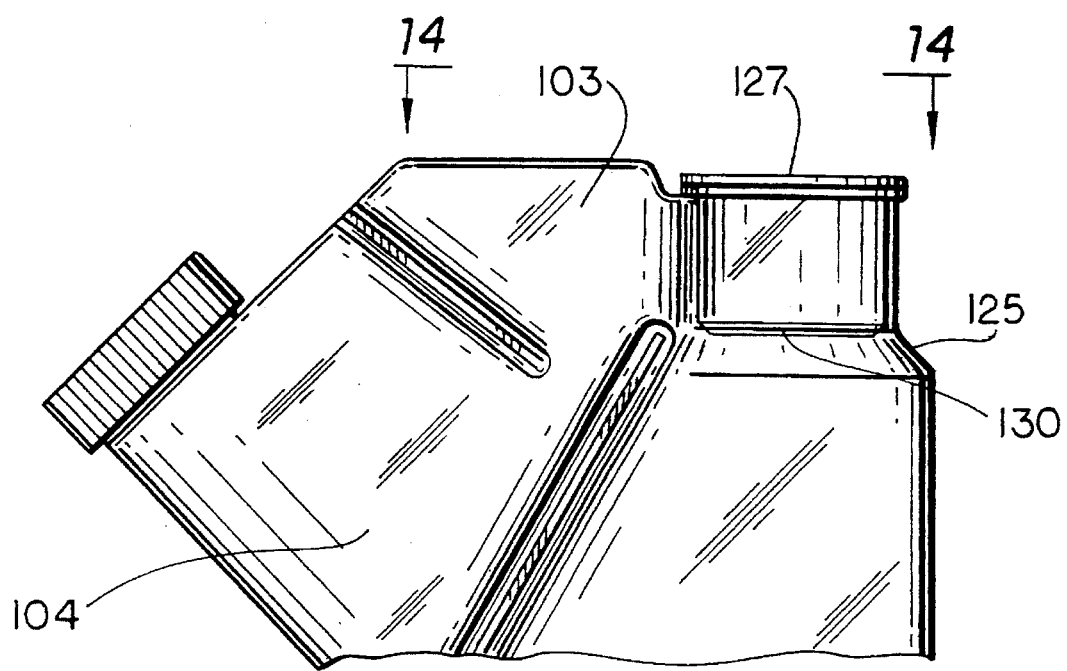
FIG. 13 is a side elevation of a portion of the container shown in FIG. 12.

The next stage in the operation of the container is to return the container, by turning it in a clockwise direction, to the position shown in FIGS. 6 and 8. As the container reaches the upright condition shown in FIG. 8, all the flowable solid material 24 above and to the right (as shown in FIG. 8) of the weir 11 will fall back into the storage chamber 2 whereas all flowable solid material contained within the measuring chamber 3 above and to the left of the weir 11 will sift or cascade over the top over the barrier 12 and will enter the dispensing chamber 4. FIG. 8 of the drawings shows the measuring chamber 3 partly emptied with the material 24 passing between the barrier 12 and the wall portion 8b. FIG. 9 shows the measuring chamber 3 totally emptied and the measured quantity of flowable solid material accommodated within the dispensing chamber 4.

Thereafter, in order to dispense that material, it is necessary only to remove the cap 23 from the screw threads 22 and again to tilt the container in a counterclockwise direction sufficient to pour the material from the dispensing chamber 4 out through the neck 21 but insufficient to pour additional material within the storage chamber 2 over the weir 11.

When all of the material within the dispensing chamber 4 has been dispensed, the container is again reverted to the initial position shown in FIG. 6 and the cap 23 is replaced on the screw thread 22 of neck 21 whereupon the total volume of material 24 within the storage chamber will be the initial volume minus the amount which has been measured and dispensed as described in the preceding paragraphs.

The second embodiment illustrated in FIGS. 11 to 19 of the drawings is similar to the above described first embodiment and will now be described in detail.

The essential difference between the first and second embodiments is that the second embodiment does not have a screw threaded neck in the top of the container for filling the storage chamber but, instead, has an opening which is closable by a plug and, as will be described in detail, that plug cooperates with the barrier weir to define access between the storage and measuring chambers.

Thus, a container 101 comprises a storage chamber 102, a measuring chamber 103 and a dispensing chamber 104. The storage chamber 102 is confined by a base 105, a rear wall 106 and a front wall 108a, 108b. The storage chamber 102 is confined at its upper end by plug structure to be defined hereinafter and side walls 109, 110 complete the enclosure.

The measuring chamber 103 and the dispensing chamber 104 are located on the opposite side of the front wall portion 108b from the storage chamber 102 and integral molding of the container provides a web 116 between the measuring and dispensing chambers and the front wall portion 108b. As in the embodiment described with reference to FIGS. 1 to 10, the wall portion 108b terminates in weir 111 and a further barrier 112 separating the measuring and dispensing chambers provides a passage 113 for flow of material from one to the other.

A screw threaded neck 121 receives a mating cap 123 and provides a closable pouring spout for dispensing material from the dispensing chamber 104.

Toward their upper ends, the rear wall 106 and side walls 109, 110 of the storage chamber are angled inwardly to provide a shoulder 125 which merges with a part cylindrical passage 126 which opens through the top of the container. The cylindrical passage is interrupted only in that region which faces the measuring chamber 103 and is dimensioned to receive a cup shaped plug 127. The interruption in the cylindrical passage is most clearly shown in FIG. 14 of the drawings where the boundaries of the interruption facing the measuring chamber 103 are identified by reference numerals 128 and 129. When the plug 127 is snugly seated in the receiving passage 126 the bottom 130 of the plug is aligned with the upper extremity of the shoulder 125 and the bottom and side walls of the plug 127 cooperate with the Weir 111 to confine a passage 131 between the storage chamber 102 and the measuring chamber 103.

The storage chamber may be filed with flowable solid material by removing the plug 127 from the passage 126 and pouring the material directly into the storage chamber. Thereafter the plug 127 is inserted into the passage and pushed downwardly into a snug seating therein to adopt the above described position where the bottom 130 of the plug is aligned with the upper extremity of the shoulder 125.

Figure 18:
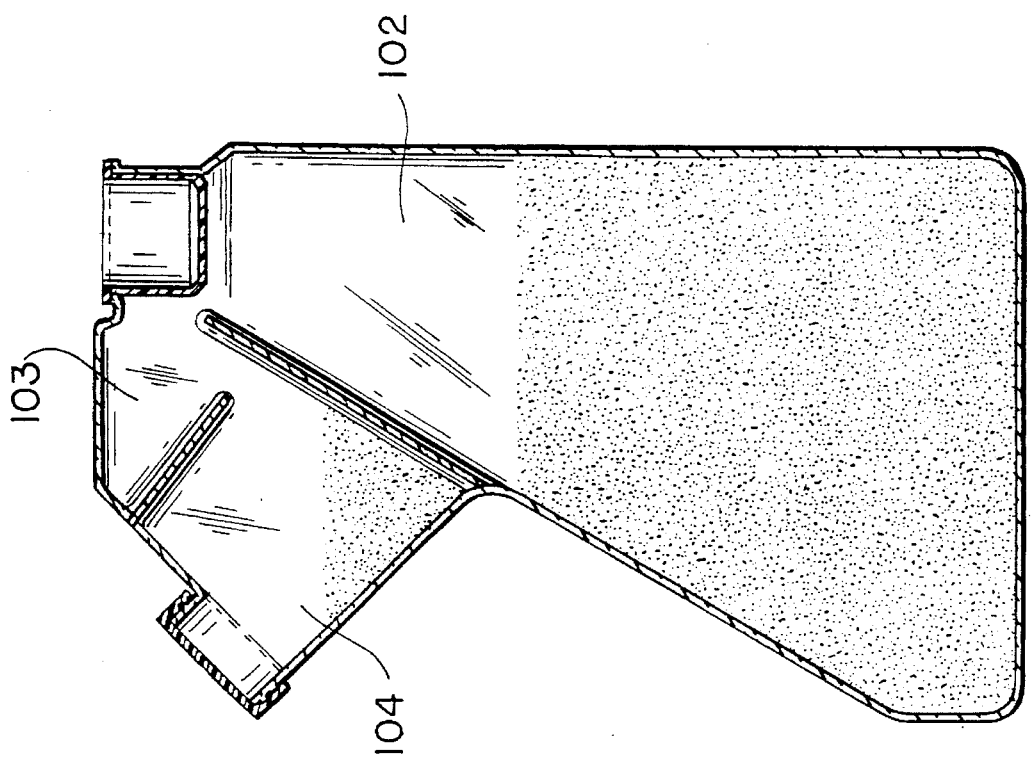
FIG. 18 is a view similar to FIG. 17 but shows the container in a third phase of operation.
Figure 17:
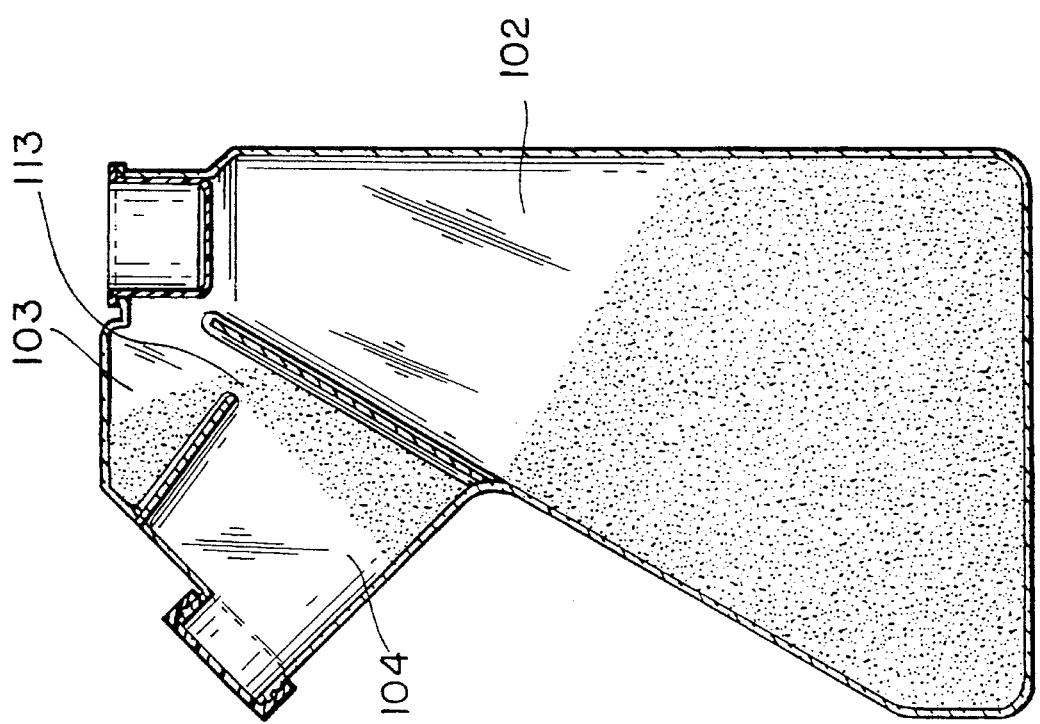
FIG. 17 is a view similar to FIG. 15 but shows the container in a second phase of operation.

Thereafter, the measuring and dispensing sequential steps are as described in the case of the first embodiment with reference to FIGS. 6 to 9. Thus, the container is first rotated in a counterclockwise direction to adopt the position shown in FIG. 16 of the drawings whereupon the flowable solid material passes from the storage chamber 102 through the passage 131 into the measuring chamber 103 until the measuring chamber is completely filled. The container is then returned to its upright position shown in FIGS. 17 and 18, FIG. 17 showing the material transferring from the measuring chamber to the dispensing chamber (all surplus material having been returned to the storage chamber 102) and FIG. 18 showing that transfer complete and all the material to be dispensing located within the dispensing chamber 104. Finally, FIG. 19 shows the dispensing step with the cap 123 removed from the neck 121 and the container rotated counterclockwise to a position in which all of the material in the dispensing chamber 104 passes freely through the neck, the rotation being insufficient to cause additional material to pass from the storage chamber 102 through the passage 131.

The above described embodiment shown in FIGS. 11 to 19 of the drawings utilizes a relatively restricted passage 131 between the storage chamber and the measuring chamber. In that embodiment the passage is confined by the side walls of the closure plug 127.

The embodiment illustrated in FIGS. 20 through 28 has a similar restricted passage 231 defined by the molded configuration of a container 201. In this modified embodiment shown in FIGS. 20 through 28, the benefits of a restricted passage are provided in a structure which utilizes a filling passage provided by a neck 218 having external screw threads 219 to receive a mating screw threaded cap 220.

As it is only the upper portion of the container 201 which differs from the previously described embodiments, it is unnecessary to describe in detail either the structure of the storage, measuring and dispensing chambers or the steps performed in measuring and dispensing a controlled amount of flowable solid material. It is necessary only to indicate that the container 201 comprises a storage chamber 202, a measuring chamber 203 and a dispensing chamber 204 which is closable by a cap 223 mountable for retention on a screw threaded neck 221.

The measuring and dispensing chambers are located on the opposite side of a front wall portion 208b from the storage chamber 202 and, being an integral molded unit, are connected to that front wall portion by a web 216. The measuring and dispensing chambers are separated from one another by a barrier 212 which, as in the previously described embodiments, extends downwardly inwardly from an outer surface and terminates short of the wall portion 208b to define a passage 213 providing communication between the measuring and dispensing chambers.

Figure 20:
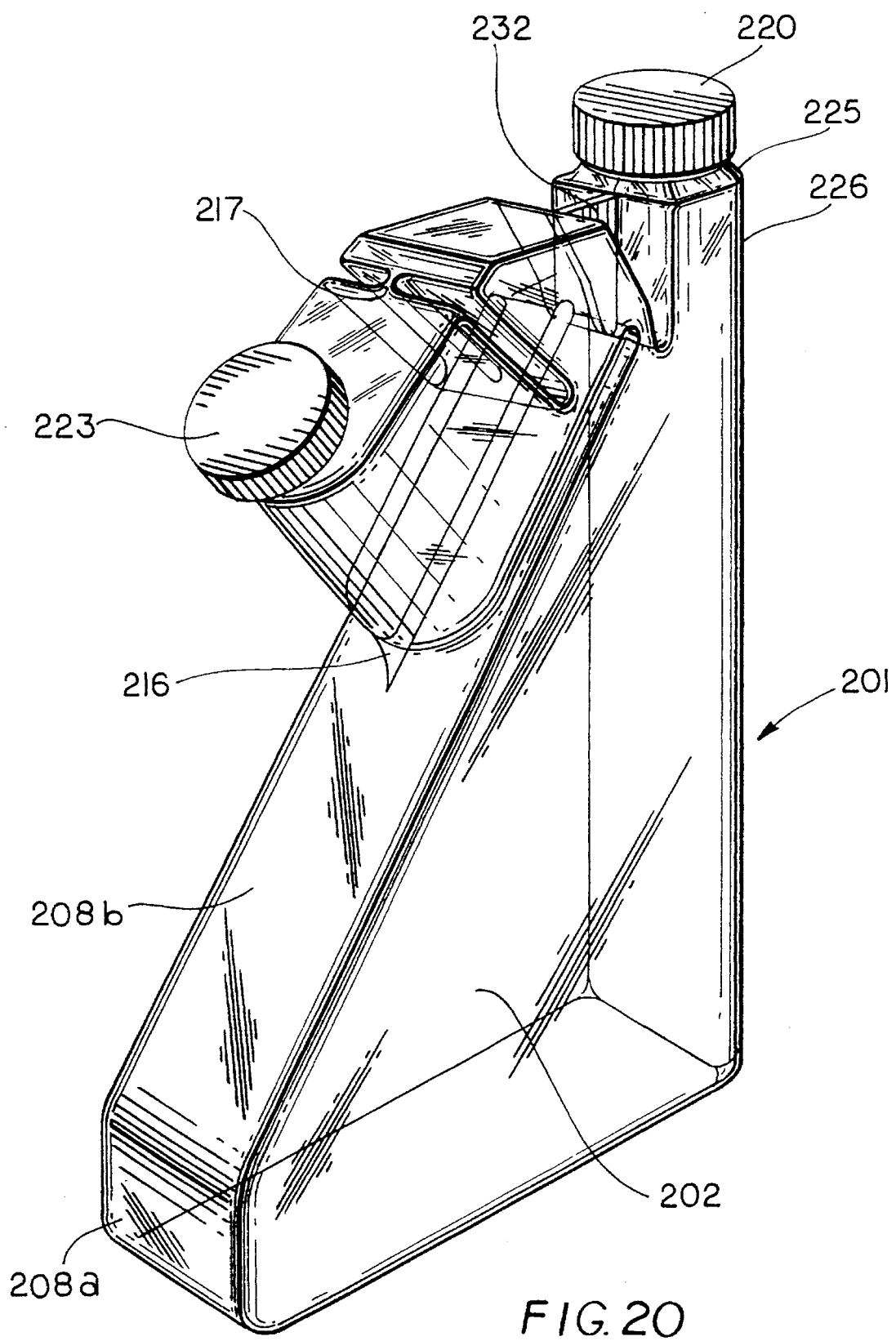
FIG. 20 is a perspective view of a third embodiment of a container of the invention shown in an upright position.
Figure 21:
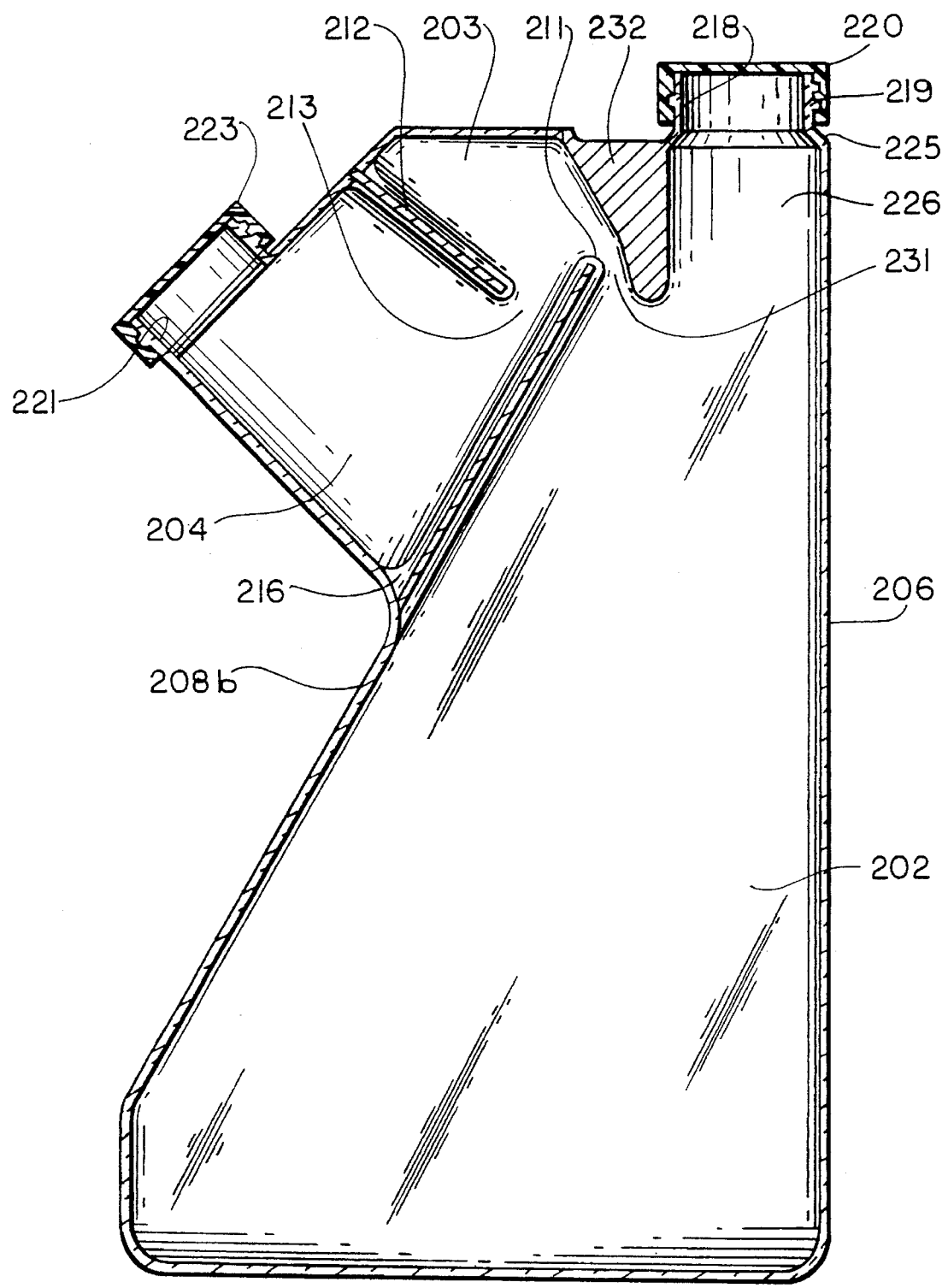
FIG. 21 is a sectioned side elevation of the container shown in FIG. 20.
Figure 23:
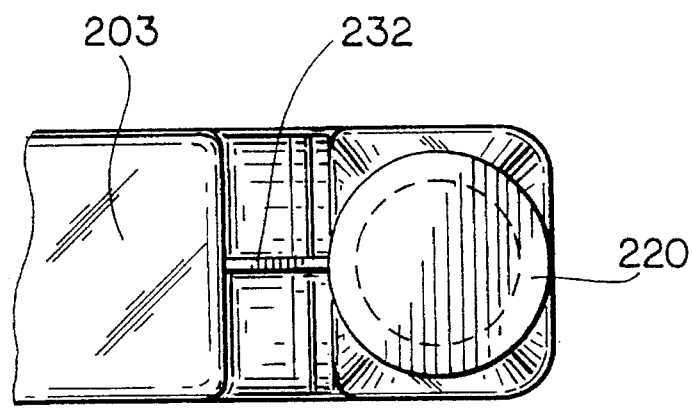
FIG. 23 is a view along the line 23—23 of FIG. 22.
Figure 22:
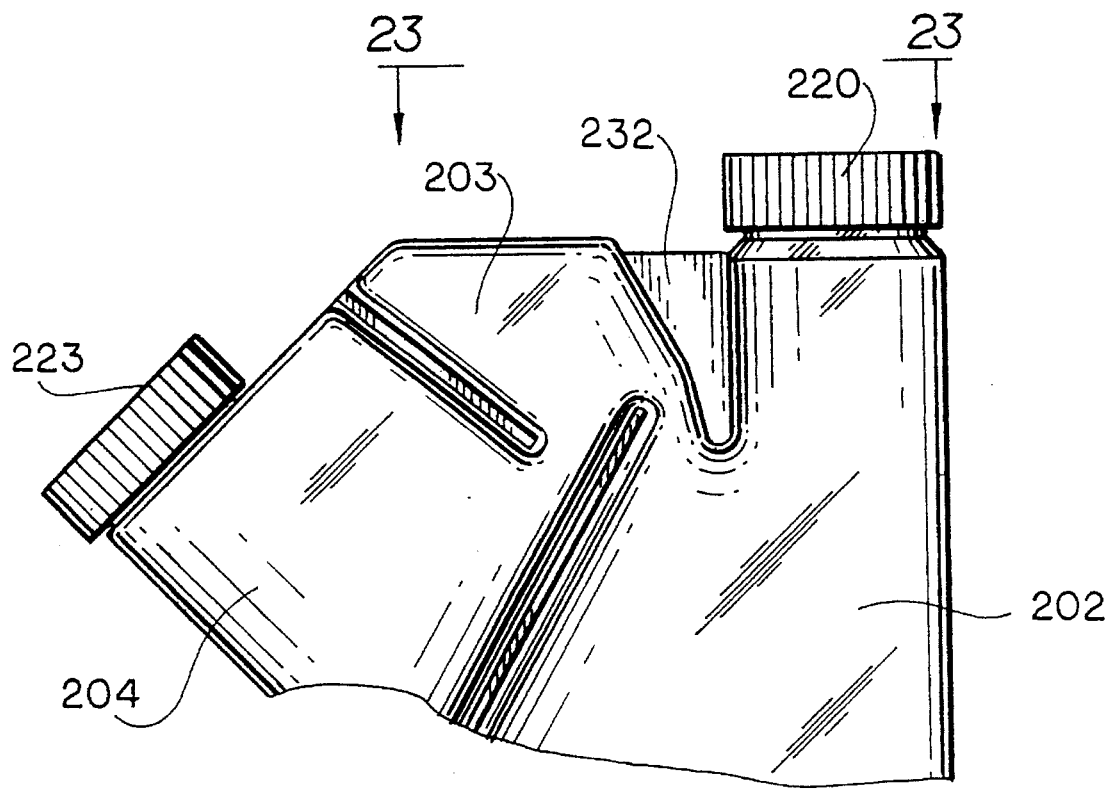
FIG. 22 is a side elevation of the upper portion of the container shown in FIG. 20.

As most clearly shown in the perspective view of FIG. 20 of the drawings, this third embodiment has a filling passage 226 which extends from the upper rear portion (as shown in FIGS. 20 and 21) of the storage chamber and terminates in the screw threaded neck 219 to be closable by the cap 220. Again as shown in FIGS. 20 and 21, the passage 226 merges with the neck 218 through an interposed angled shoulder 225 which enables the external periphery of the cap 220 to lie substantially flush with the rear wall 206 of the storage chamber.

The filling passage 226 is spaced from the rear wall of the measuring chamber 203 and rigidity is imparted to the container in this area by a web 232 which, together with webs 216 and 217, is an integral part of the molded container.

Figure 25:
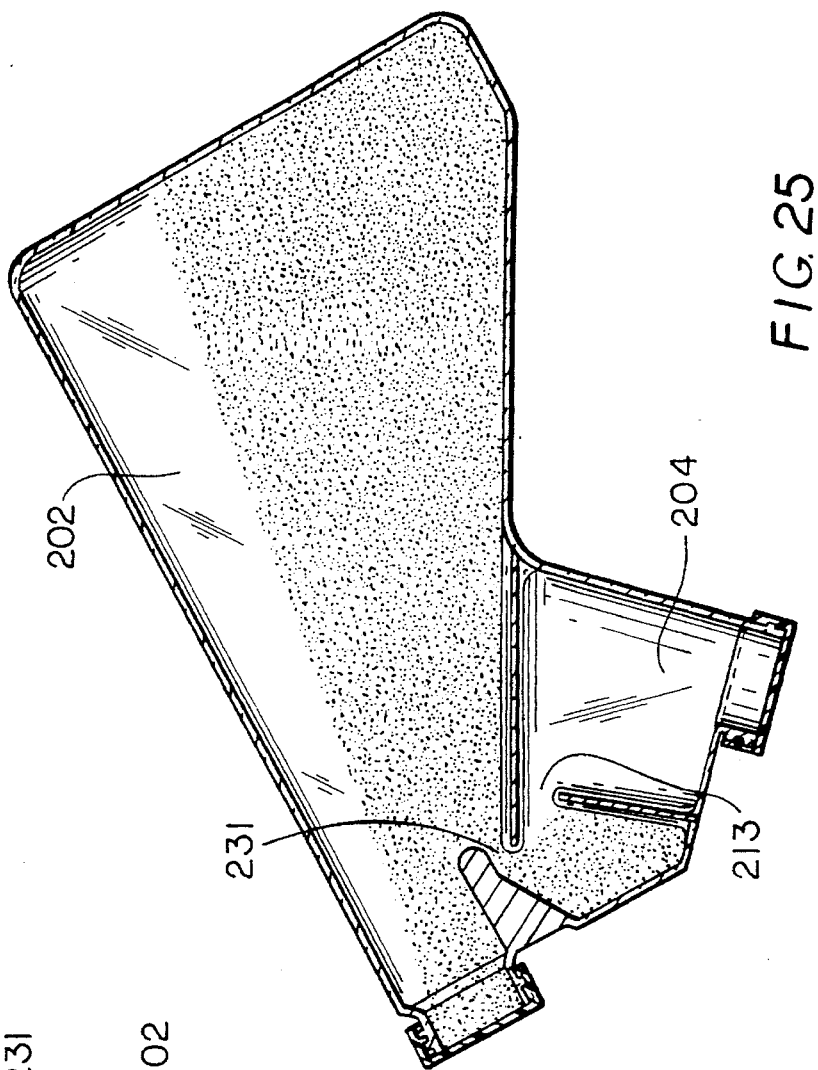
FIG. 25 is a view similar to FIG. 24 but shows the container in a position rotated in an counterclockwise direction during a first phase of operation.
Figure 24:
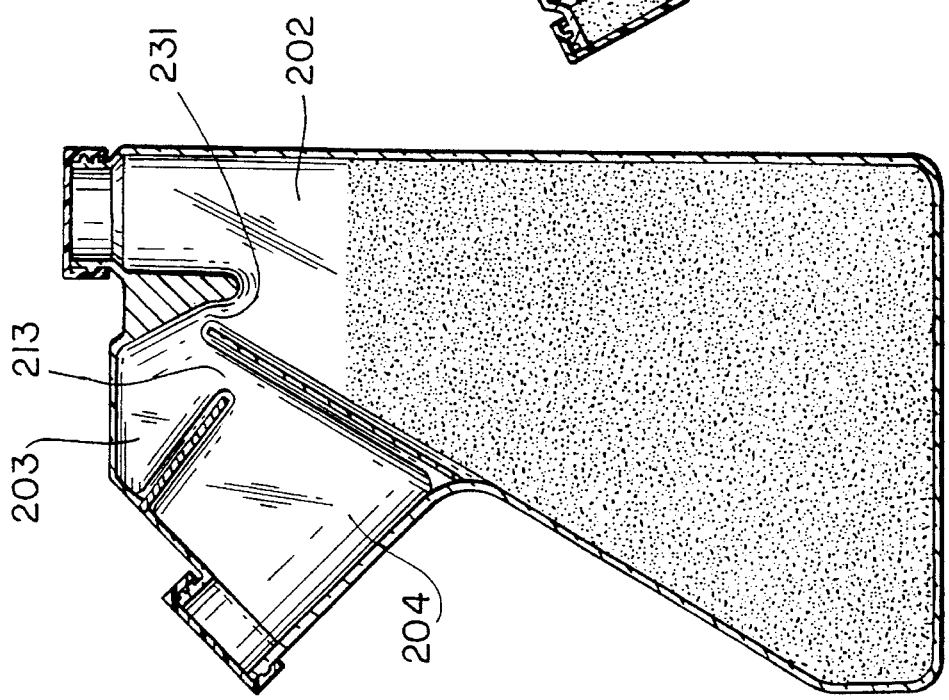
FIG. 24 is a sectioned side elevation of the container shown in FIG. 20 partially filled with a flowable solid material.
Figure 27:
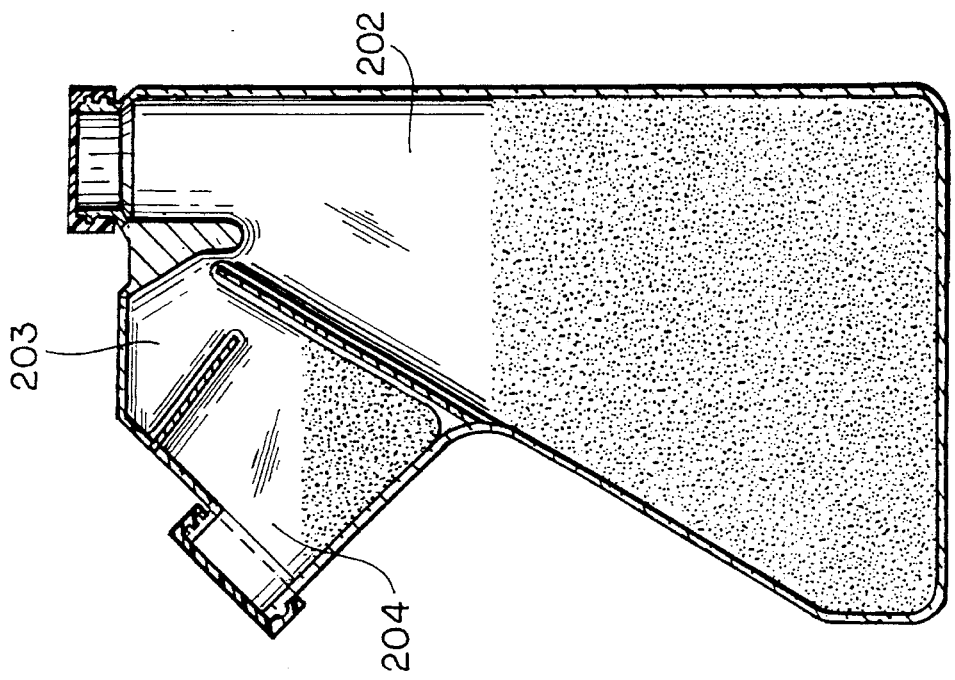
FIG. 27 is a view similar to FIG. 24 but shows the container in a third phase of operation.
Figure 26:
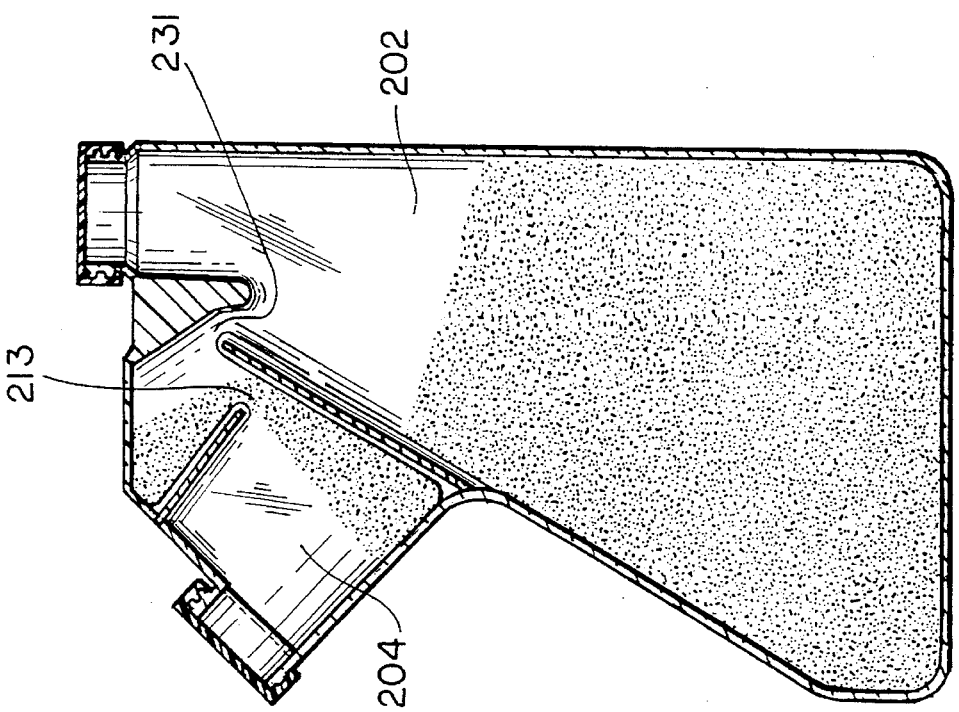
FIG. 26 is a view similar to FIG. 24 but shows the container returned to an upright position during a second phase of operation.
Figure 29:
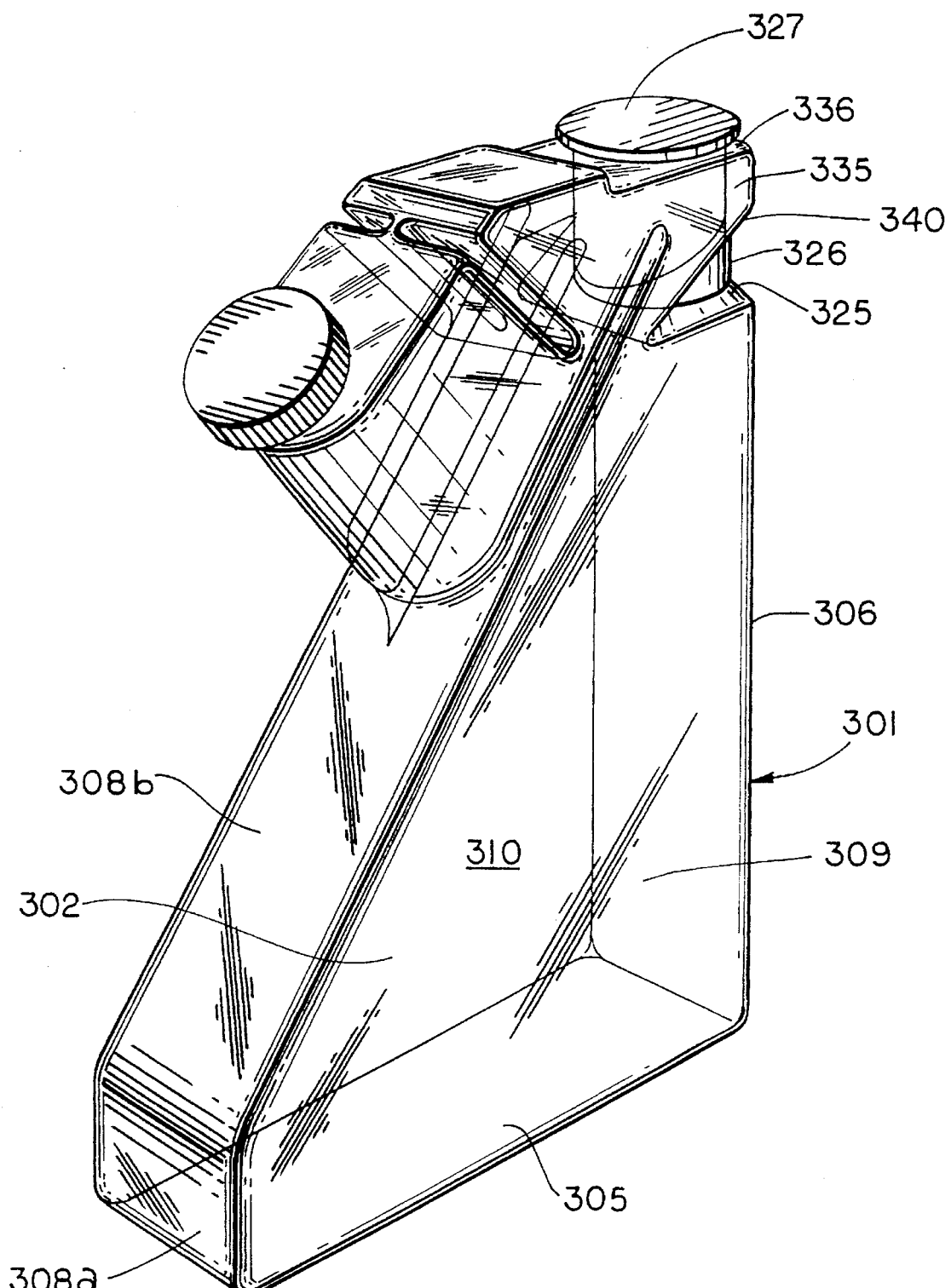
FIG. 29 is a perspective view of a fourth embodiment of a container of the invention shown in an upright position.
Figure 30:
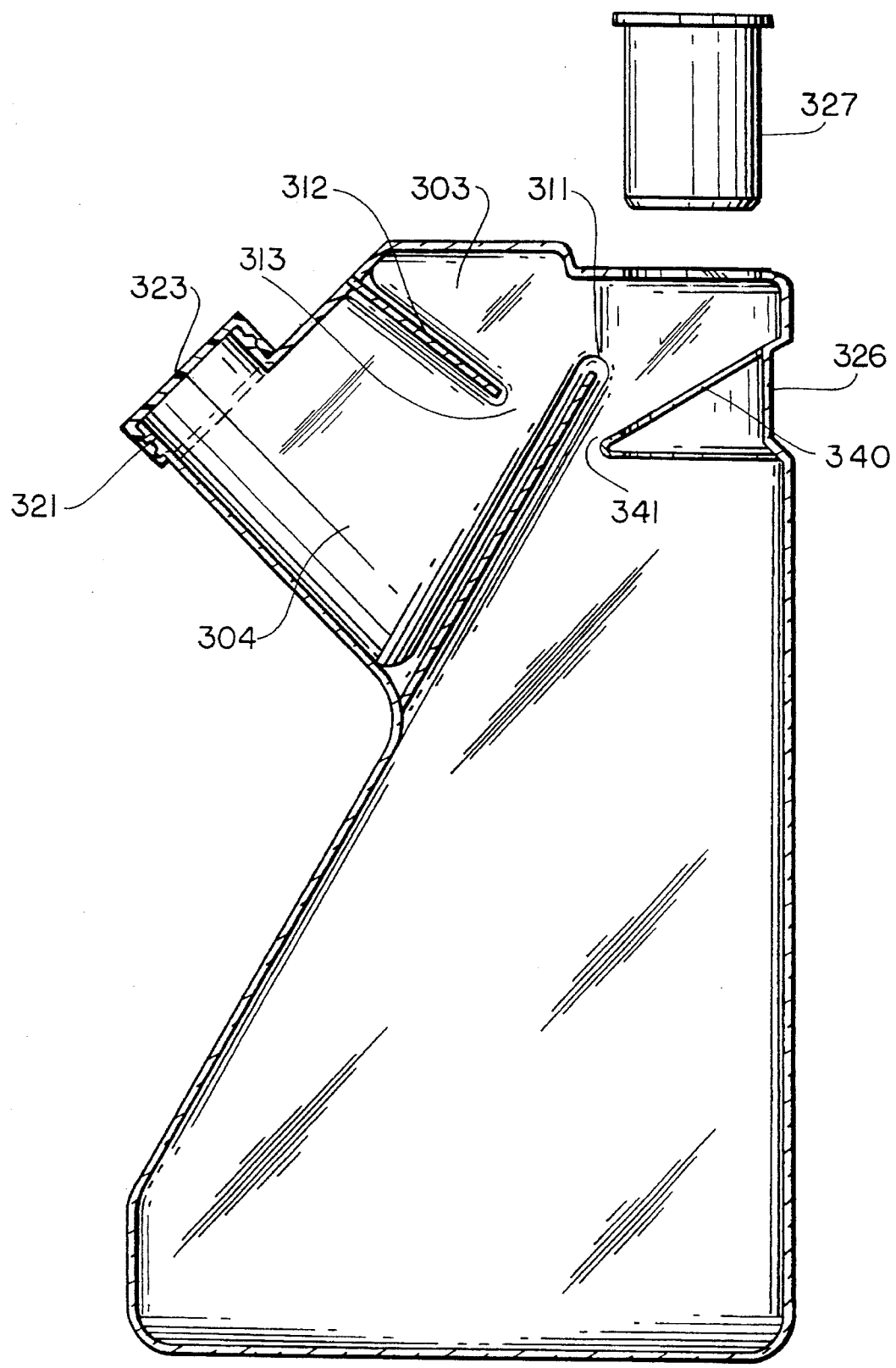
FIG. 30 is a partially exploded sectioned side elevation of the container shown in FIG. 29.
Figure 32:
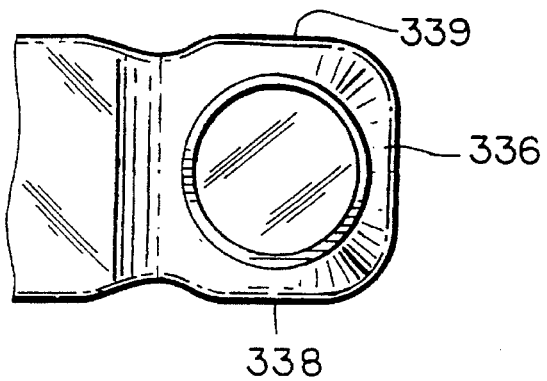
FIG. 32 is a top view of FIG. 31.
Figure 33:
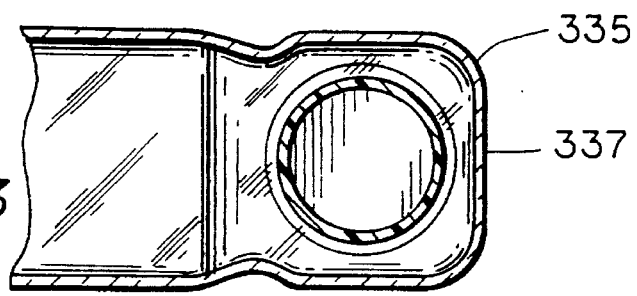
FIG. 33 is a section along the line 33—33 of FIG. 31
Figure 31:
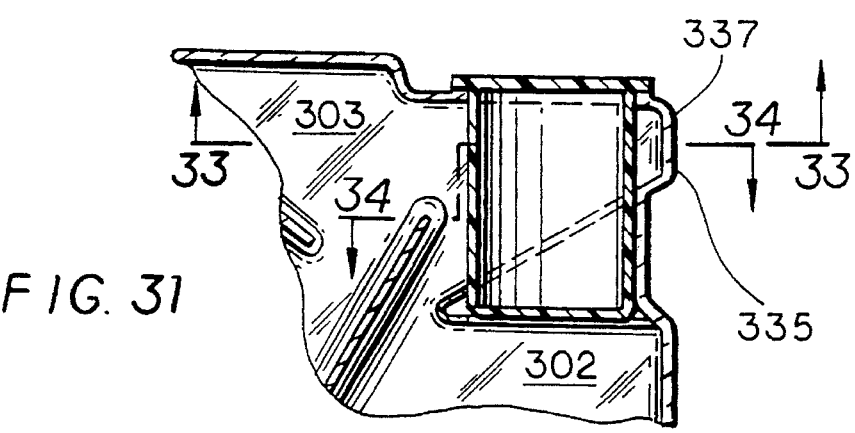
FIG. 31 is a sectioned side elevation of a portion of the container shown in FIG. 29.

The side elevation shown in FIG. 21 of the drawings most clearly shows how the rear wall of the measuring chamber 203 cooperates with weir 211 to define a relatively narrow passage 231 through which flowable solid material will pass when the container is rotated in a counterclockwise direction to assume the position shown in FIG. 25 of the drawings where filling of a measuring chamber has been almost completed. Thereafter, the steps followed to return surplus material to the storage chamber 202 and to transfer the measured amount of flowable solid material from the measuring chamber to the dispensing chamber are the same as discussed in connection with the embodiments shown in FIGS. 1 through 9 and 10 through 19. Finally, the cap 223 is removed and the container is again tilted in a counterclockwise direction to dispense the material from the dispensing chamber through the neck 221. The provision of the relatively narrow passage 131 and 231 has a number of advantages over the more open structure illustrated in the embodiment of FIGS. 1 to 9. In particular, by locating the weir 111 (FIG. 12) in relatively close proximity to a surface defining the rearward extremity of the measuring chamber, there is even less opportunity for surplus flowable solid material to enter the measuring chamber rather than return to the storage chamber when, having filled the measuring chamber (FIGS. 16 and 25), the container is returned to the upright position shown in FIGS. 17 and 26. This leads to an even more accurate accumulation of a measured amount of material in the dispensing chamber prior to dispensing through the neck 121, 221.

A fourth embodiment of the container of the invention is illustrated in FIGS. 29 through 41 of the drawings. This fourth embodiment makes it possible to measure and dispense alternative amounts of flowable solid material. As will be described hereinafter, the fourth embodiment provides first and second measuring chambers. The first measuring chamber is similar to the measuring chamber described in detail with respect to each of the first three embodiments. As in those embodiments, material to be dispensed is transferred from the measuring chamber to a dispensing chamber. This fourth embodiment provides a second measuring chamber which may be used to remove a predetermined volume of flowable solid material from the dispensing chamber prior to the dispensing step.

In order to achieve this second measurement, the container 301 of the fourth embodiment includes, as shown in FIGS. 29 through 41, a base 305, rear wall 306, front wall portions 308a, 308b and side walls 309, 310 which define a storage chamber 302.

The front wall portion 308b tapers upwardly in the manner described in the previous embodiments to separate a first measuring chamber 303 and a dispensing chamber 304 from the storage chamber 302 and terminates in a weir 311 over which material contained in the storage chamber 302 can be poured to fill the first measuring chamber 303 when the container is rotated in a counterclockwise direction to assume the position shown in FIG. 36 of the drawings.

The first measuring chamber is, like the measuring chambers of the previously described embodiments, generally triangular in configuration and is separated from the dispensing chamber 304 by a barrier 312. That barrier 312 extends in the direction of the front wall portion 308b but terminates short of that wall portion to define a passage 313 to provide communication between the first measuring chamber 303 and the dispensing chamber 304.

Figure 41:
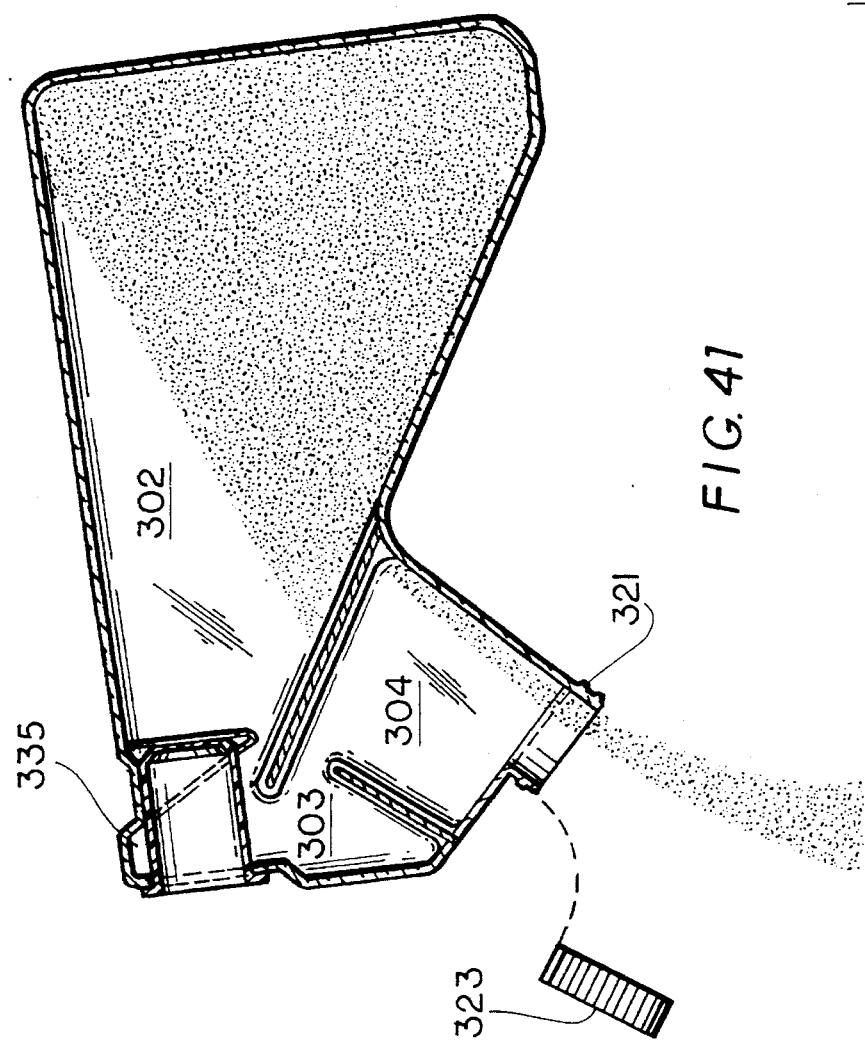
FIG. 41 is a view similar to FIG. 36 but shows the container in a final stage of operation.

A screw threaded neck 321, which is closable by a mating cap 323, is located in the upper surface of the dispensing chamber 304 for dispensing the final measured volume of material in the manner most clearly shown in FIG. 41 of the drawings. In order to fill the storage chamber with flowable solid material, a cylindrical passage 326 opens through the top of the container and is closable by a plug 327. As most clearly shown in FIG. 29 of the drawings, the rear wall 306 and side walls 309, 310 of the container define an angled shoulder 325 at their upper ends, which shoulder merges with the cylindrical passage 326.

The embodiment illustrated in FIGS. 29 to 41 of the drawings differs from the previously described embodiments in that it provides a second measuring chamber. That second measuring chamber is depicted by reference numeral 335 and extends around the passage 326. The second measuring chamber 335 has an upper surface 336, a rear wall 337 and side walls 338, 339. The underside of the second measuring chamber 335 is angled forwardly and downwardly and terminates short of the upper end of the front wall portion 308b of the storage chamber to define a passage 341 through which material may be poured from the storage chamber.

Before describing the sequential steps of operation of this fourth embodiment, the functions of the first and second measuring chambers will first be briefly outlined. As in the preceding embodiments, the first measuring chamber is filled from the storage chamber and the measured volume is transferred to the dispensing chamber while surplus material is returned to the storage chamber. At this point there is a predetermined measured volume of material in the dispensing chamber which could readily be dispensed. However, it may be desired to dispense less than all of that measured volume and to achieve this the second measuring chamber 335 is then filled from the dispensing chamber. Once the second measuring chamber has been filled, then the material in that second measuring chamber is returned to the storage chamber and the remainder is returned to the dispensing chamber for dispensing through the neck 321.

If, for example, the volume of the first measuring chamber 303 is twice the volume of the second measuring chamber 335, then, as will be described, the initial measuring will result in the volume of the first measuring chamber being deposited in the dispensing chamber. Thereafter, one half of that volume can be removed by first filling and then emptying the second measuring chamber and the remaining half is returned to the dispensing chamber for dispensing.

Referring now to FIGS. 35 to 41 of the drawings, the container is first filled by removing the plug 327 from the passage 326 and pouring flowable solid material into the storage chamber 302. Thereafter, the plug 327 is replaced in the passage 326 to close the container and the container is shown standing filled in an upright position in FIG. 35 of the drawings. The container is then rotated in a counterclockwise direction to adopt the position shown in FIG. 36 of the drawings where the flowable solid material passes through the passage 341 to fill the first measuring chamber 303 in the same manner as described in connection with the previous embodiments.

Figure 37:
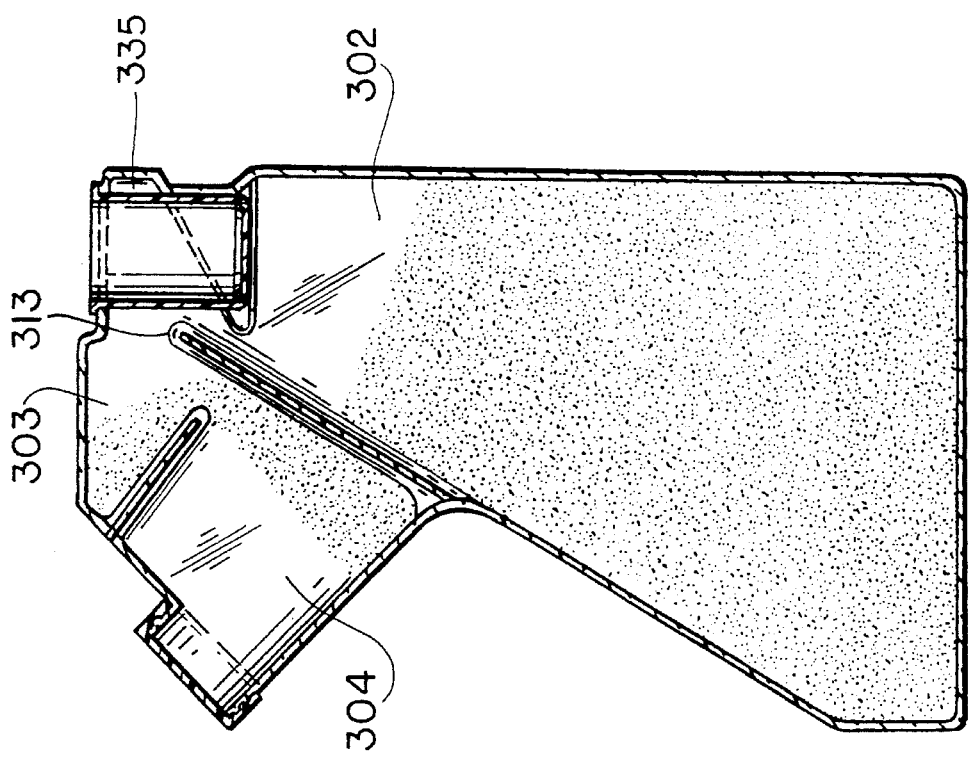
FIG. 37 is a view similar to FIG. 35 but shows the container in a second phase of operation.
Figure 38:
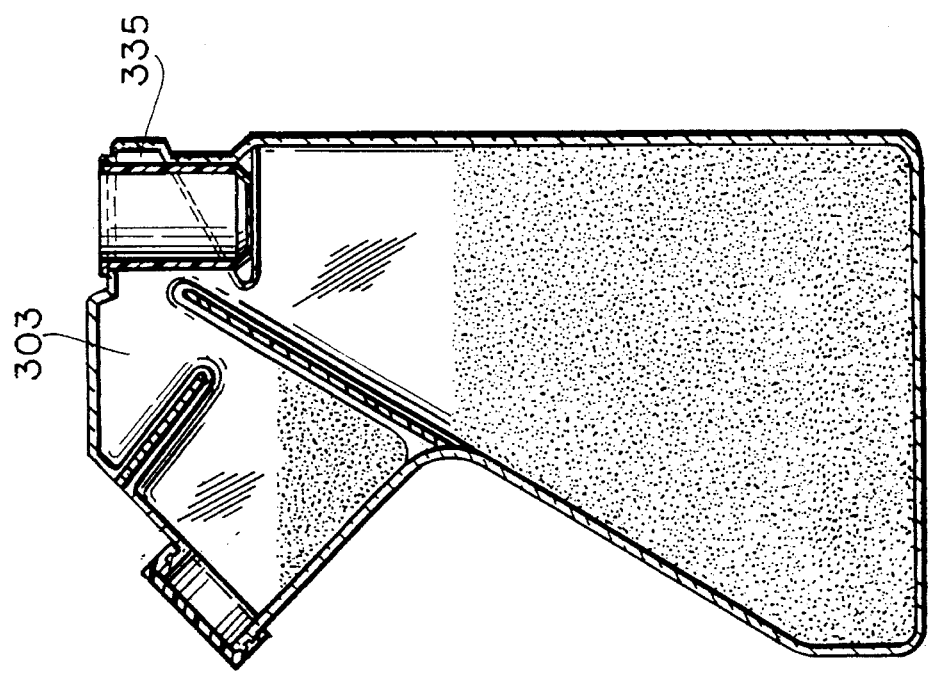
FIG. 38 is a view similar to FIG. 37 but shows the container in a third phase of operation.

Once the first measuring chamber 303 has been filled, the container is then returned to the upright position and FIG. 37 shows the container in that position with material flowing from the first measuring chamber 303 into the dispensing chamber 304. FIG. 38 shows that flowing complete and the amount of flowable material measured by the first measuring chamber 303 is accommodated in the dispensing chamber 304.

Figure 34:
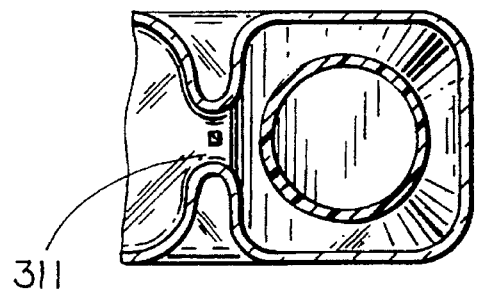
FIG. 34 is a section along the line 34—34 of FIG. 31.
Figure 39:
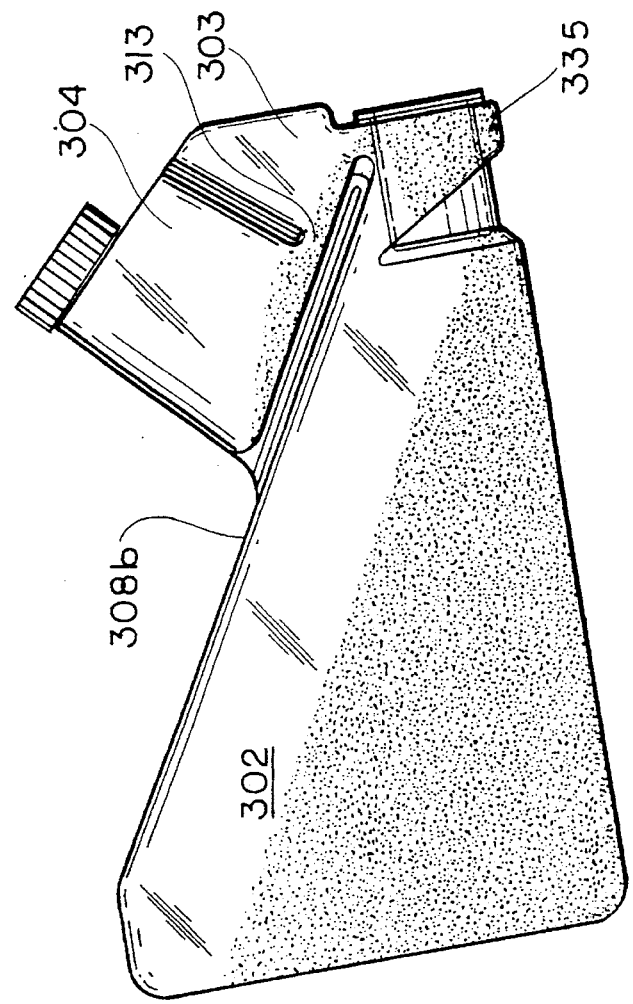
FIG. 39 is a view similar to FIG. 35 but shows the container in a position rotated in a clockwise direction during a fourth phase of operation.
Figure 40:
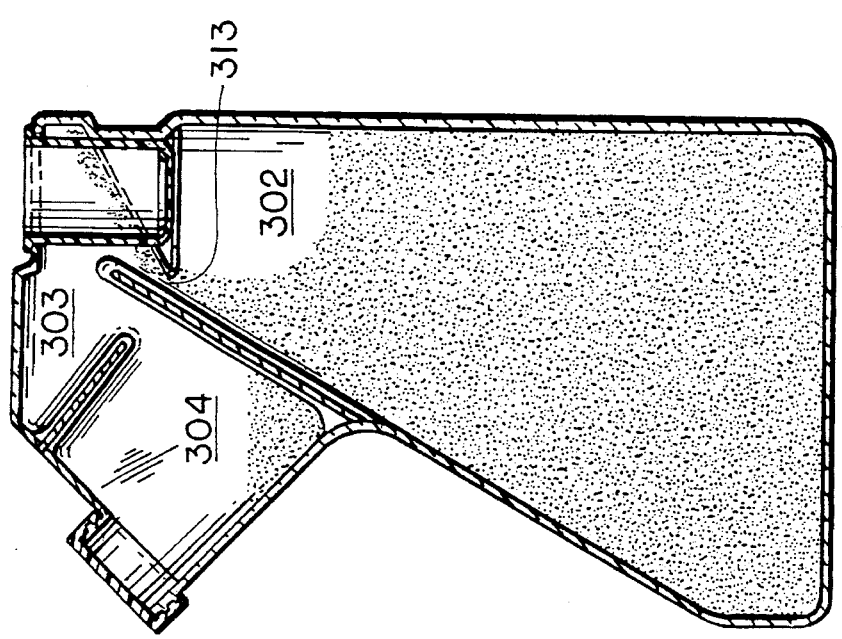
FIG. 40 is a view similar to FIG. 35 but shows the container in a fifth stage of operation.
Figure 42:
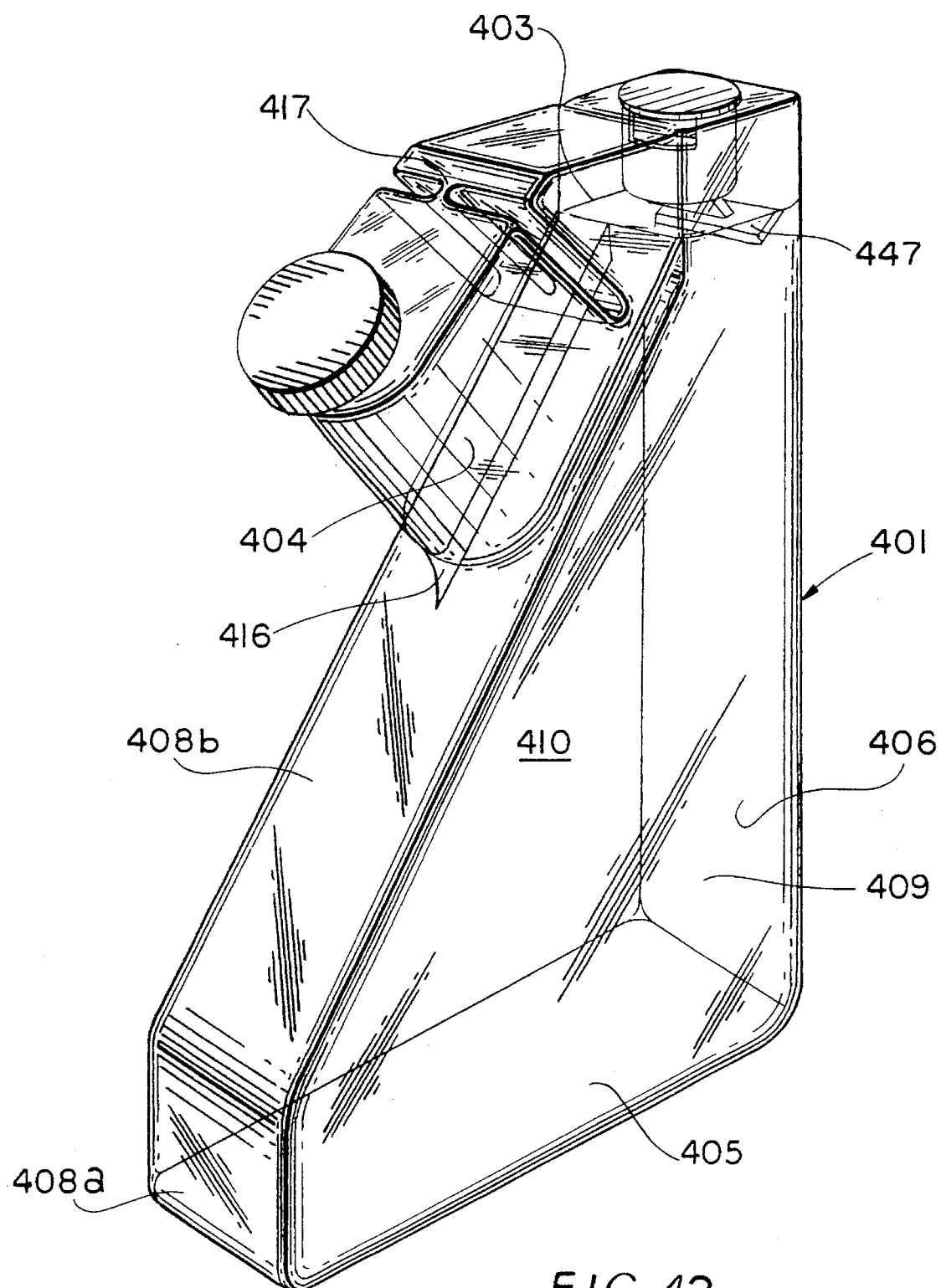
FIG. 42 is a perspective view of a fifth embodiment of a container of the invention shown in an upright position.

If it is then desired to reduce the amount of measured material by a second predetermined amount which is controlled by the volume of the second measuring chamber 335, then the container is rotated in a clockwise direction to assume the position shown in FIG. 39 of the drawings where the already measured volume of flowable solid material then passes from the dispensing chamber 304 through the passage 313 and below the first measuring chamber 303 along the front wall portion 308b and over the weir 311 to enter the second measuring chamber 335. When that second measuring chamber is completely filled, the flow of material ceases and, when the container is again returned to the upright position as shown in FIG. 34, that portion of material which occupied the second measuring chamber 335 will be returned to the storage chamber 302 whereas the volume of material which had not entered the second measuring chamber but remained lying along the front wall portion 308b will again be returned to the dispensing chamber 304 as shown in FIG. 40 of the drawings. Thereafter, following removal of the cap 323, rotating of the container to the position shown in FIG. 41 will pour the reduced measured amount from the container.

By way of example, if the first measuring chamber 303 has a volume of 9 cubic centimeters and the volume of the second measuring chamber 335 is 3 cubic centimeters, it will be appreciated that it is possible to dispense either 9 cubic centimeters, 6 cubic centimeters or 3 cubic centimeters as desired. If, in such hypothetical example, it is desired to dispense only 3 cubic centimeters, then the second measuring chamber 335 would be filled twice from the dispensing chamber.

A fifth embodiment of the invention also makes it possible to measure and dispense alternative amounts of flowable solid material. This fifth embodiment is illustrated in FIGS. 42 through 56 of the drawings and, as in the fourth embodiment illustrated in FIGS. 29 through 41 of the drawings, provides first and second measuring chambers. As will be apparent from the following detailed description of this fifth embodiment, the second measuring chamber is provided in a plug provided for closing an opening through which the storage chamber may be filled.

Referring now to FIGS. 42 to 56 of the drawings, a container 401 is, as in the preceding embodiments, defined by a base 405, a rear wall 406, front wall portions 408a, 408b and side walls 409, 410. A first measuring chamber 403 and a dispensing chamber 404 are provided on the opposite side of front wall portion 408b from a storage chamber 402.

As in the previous embodiments, the entire container is formed by molding plastics material and webs 417, 416 are created in the molding process and space the first measuring chamber 403 and the dispensing chamber 404 respectively from each other and together from the measuring chamber 402.

Again as in the preceding embodiments, the dispensing chamber 404 is provided with a neck 421 which has external screw threads 422 to receive and cooperate with a mating cap 423 in such manner that the cap may be removed to permit dispensing of a predetermined measured amount of flowable material from the dispensing chamber 404.

This fifth embodiment differs from previous embodiments in the provision of a specially constructed plug 427. That plug 427 has an external cylindrical surface 428 dimensioned snugly to seat in a bore 429 provided at the upper end of the storage chamber 402 and rearwardly of the measuring chamber 403. The snug seating is provided by an interference fit between the cylindrical surface 428 and the bore 429, which interference fit may be overridden by manual pressure enabling the plug to be introduced into and removed from the bore 429.

As will be explained in greater detail, the plug is constructed both to provide pouring communication from the storage chamber to the first measuring chamber and to provide a second measuring chamber permitting a predetermined amount of already measured material to be returned from the dispensing chamber to the storage chamber.

To this end, a core component 441 is located within the cylindrical plug 427 and defines, on one side, a passage 431 and, on the other side, a second measuring chamber 435. The passage 431 extends upwardly through an opening 432 in the bottom 430 of plug 427 and leads to a window 433 extending circumferentially part-way around the cylindrical surface 428 of the plug. As most clearly shown in FIG. 47 of the drawings, and also in the exploded view of FIG. 43, a similarly dimensioned window 434 is provided in the wall of the bore 429 to provide access to the first measuring chamber 403 and, with the plug 427 firmly seated in the bore, the two windows 433 and 434 register with one another to permit flowable solid material to pass from the storage chamber 402, through the passage 431 and the registering windows 433, 434 to enter the first measuring chamber 403. In order to facilitate this transfer of material from the storage chamber to the first measuring chamber, the upper end 442 of the core 441 is angled away from the window 433 so as not to impede the flow of material from the passage 432 through the registering windows. As most clearly shown in FIG. 44 of the drawings, the core extends from side to side of the internal surface of the plug and material may thus flow only either through the passage 431 or over the upper end 442 and apex 443 of the plug and downwardly into the second measuring chamber 435 and no material can flow around the side or end edges of the core which, as stated, extends all the way across the inside of the plug.

The second measuring chamber 435 is generally triangular in section and is confined by the top surface 444 and rear surface 445 disposed diametrically opposite the window 433. The third side of the triangular section of the second measuring chamber is provided by a downwardly angled rear surface 446 of the core 441.

Figure 46:
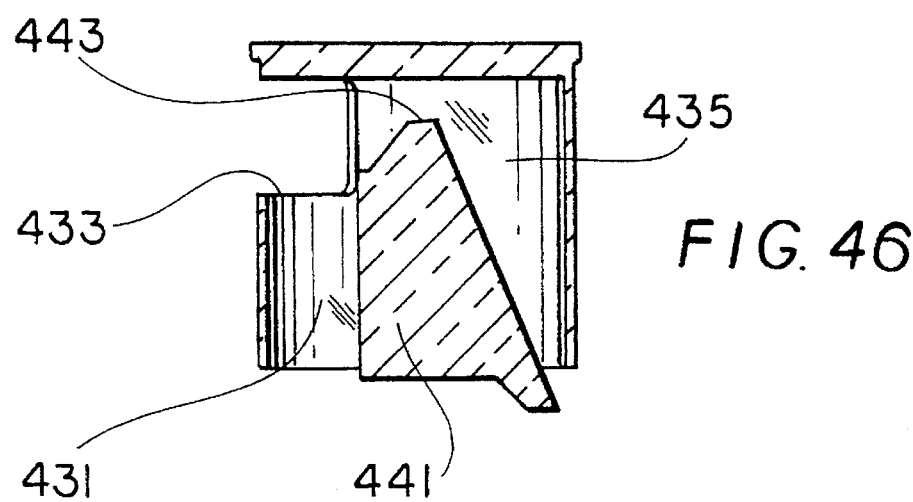
FIG. 46 is a section through that portion of the container shown in FIG. 44.
Figure 47:
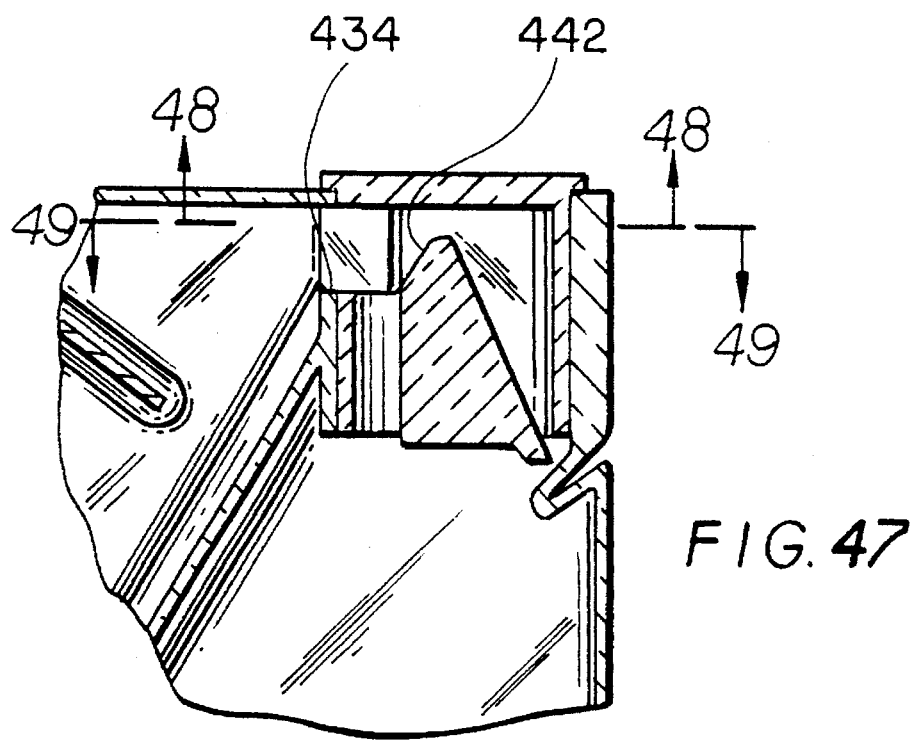
FIG. 47 is a sectioned side elevation of a portion of the container shown in FIG. 42.
Figure 48:
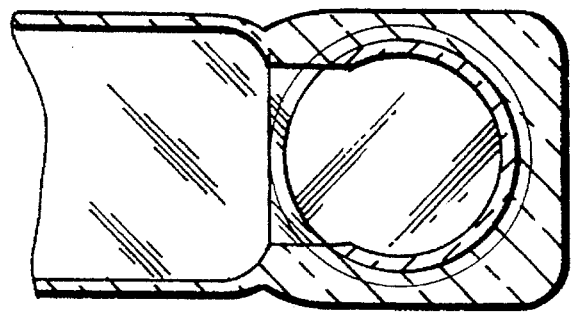
FIG. 48 is a section along the lines 48—48 of FIG. 47.
Figure 49:
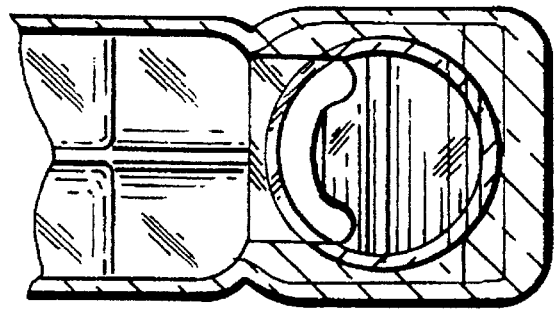
FIG. 49 is a section along the lines 49—49 of FIG. 47.

As best shown in FIG. 46, that downwardly angled rear surface 446 of the core 441 projects beyond the bottom of the plug but terminates short of a flange 447 projecting downwardly and inwardly from the rear wall 406 of the container 401. As most clearly shown in FIG. 42 of the drawings, the width of the flange 447 is such that said flange extends all the way across and beyond the bottom end of the rear surface 446 of the core 441.

The sequential steps of operation of this fifth embodiment will now be described with particular reference to FIGS. 43 and 50 through 56 of the drawings.

Figure 43:
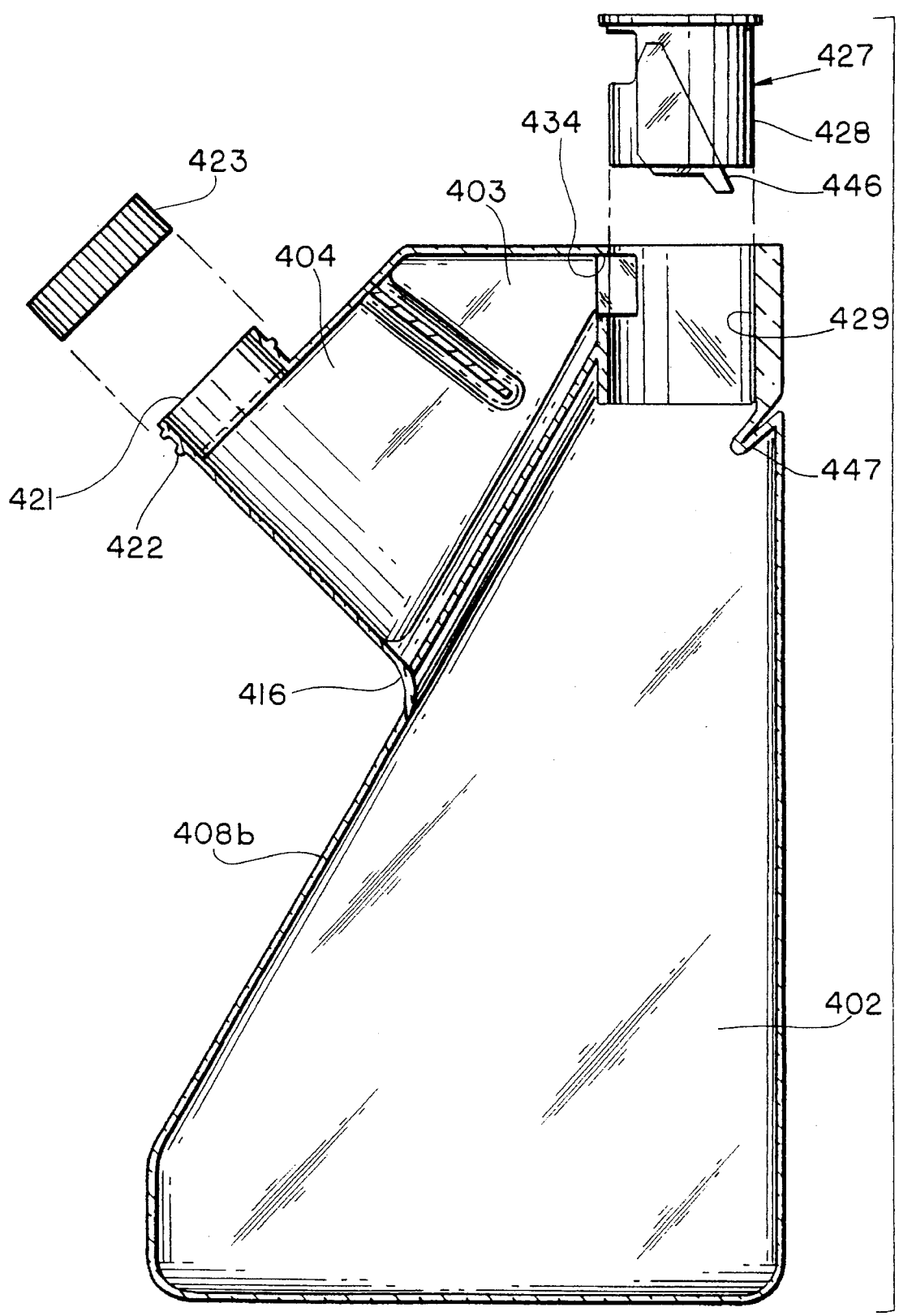
FIG. 43 is a sectioned side elevation of the container shown in FIG. 42, showing component parts of that container in an exploded condition.
Figure 44:
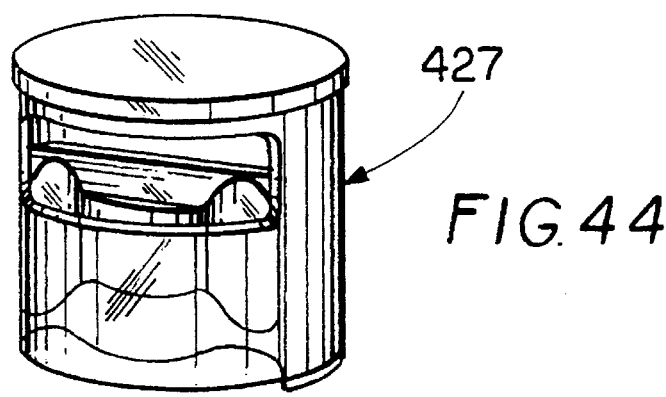
FIG. 44 is a top perspective view of a portion of the container shown in FIG. 43.
Figure 45:
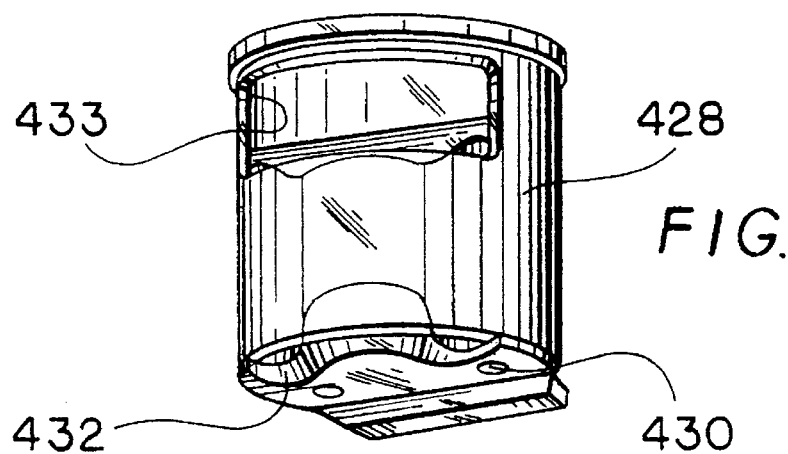
FIG. 45 is a bottom perspective view of that portion.

With the cap 423 firmly screwed on the neck 441 (FIG. 42), the plug 427 is removed from the container FIG. 43 and the storage chamber 402 is filled with material. Thereafter the plug is firmly seated in the bore 429 whereupon the filled container and all component parts are in the condition shown in FIG. 50 of the drawings.

Figures 50, 51:
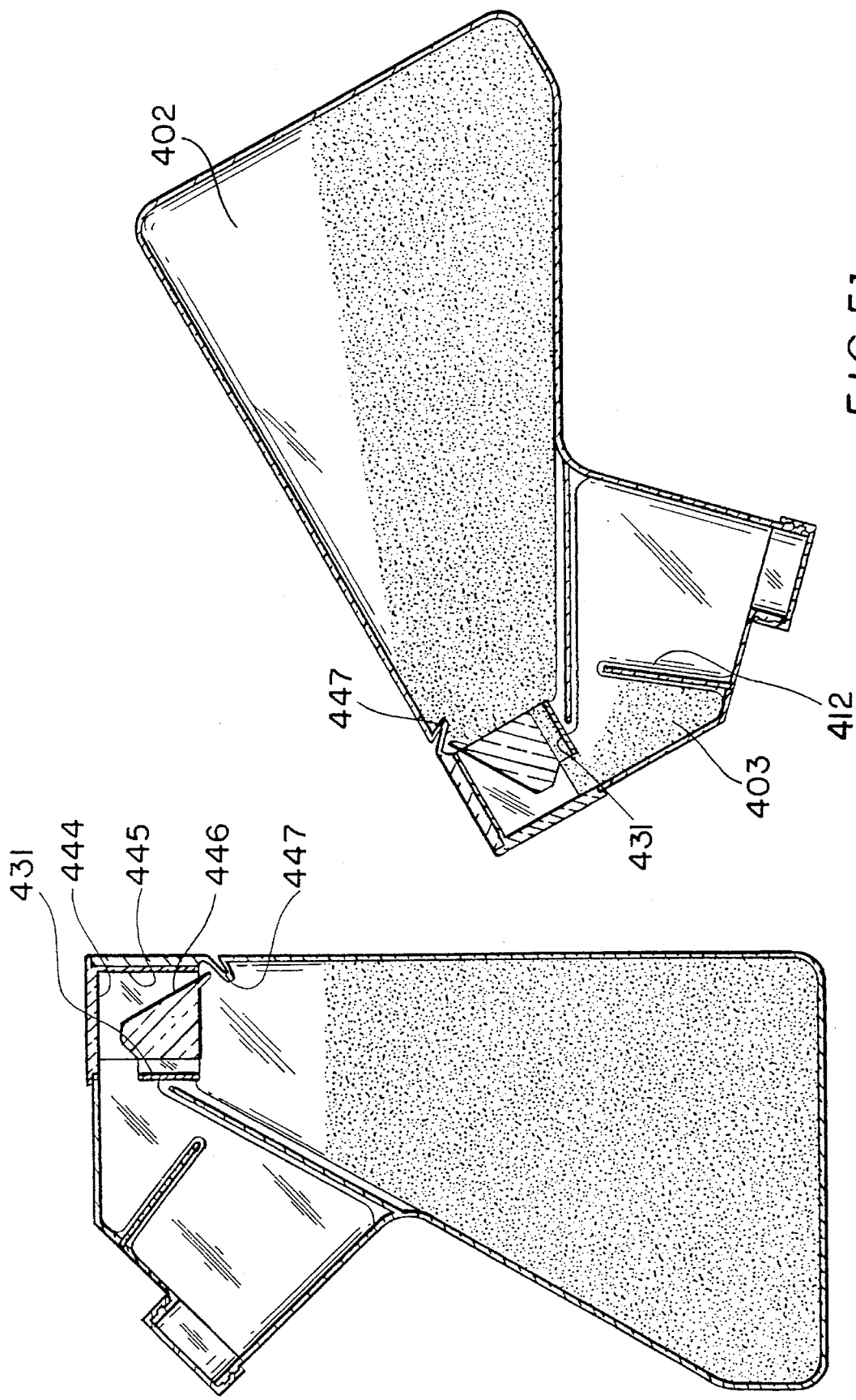
FIG. 50 is a sectioned side elevation of the container shown in FIG. 42 shown partially filed with a flowable solid material.
FIG. 51 is a view similar to FIG. 50 but showing the container in a position rotated in a counterclockwise direction during a first phase of operation.

When it is desired to measure a predetermined volume of flowable solid material, the container is rotated counterclockwise from the position shown in FIG. 50 of the drawings to that shown in FIG. 51 of the drawings. In the position shown in FIG. 51 of the drawings, two stages of operation are simultaneously accomplished. Firstly, material flows from the storage chamber 402 through the passage 431 and registering windows 433, 434 into the measuring chamber 403. Secondly, again as shown in FIG. 51 of the drawings, the material in the storage chamber 402 will seat under and against the flange 447 and that flange, in cooperation with the downward extremity of the rear surface 446 of the plug core 441, will prevent material entering from the storage chamber 402 directly into the second measuring chamber 435.

When the flowable solid material reaches a condition of equilibrium in the first measuring chamber 403, flow of material from the storage chamber 402 will cease and the first measuring chamber 403 will be filled substantially to the level of the upper extremity of barrier 412 separating the first measuring chamber 403 from the dispensing chamber 404. FIG. 1 of the drawings shows the material pouring from the storage chamber to the measuring chamber prior to filling of that chamber and the cessation of pouring when a stable condition is reached. That stable condition is similar to the position shown in, for example, FIG. 25 of the drawings.

Figure 53:
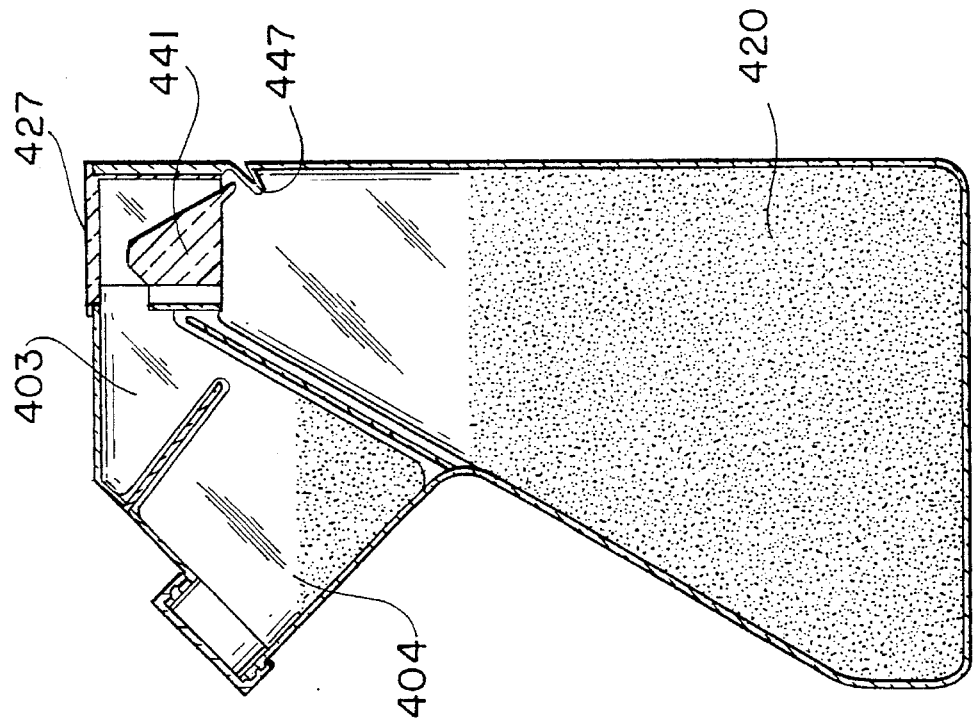
FIG. 53 is a view similar to FIG. 52 but shows the container in a third phase of operation.
Figure 52:
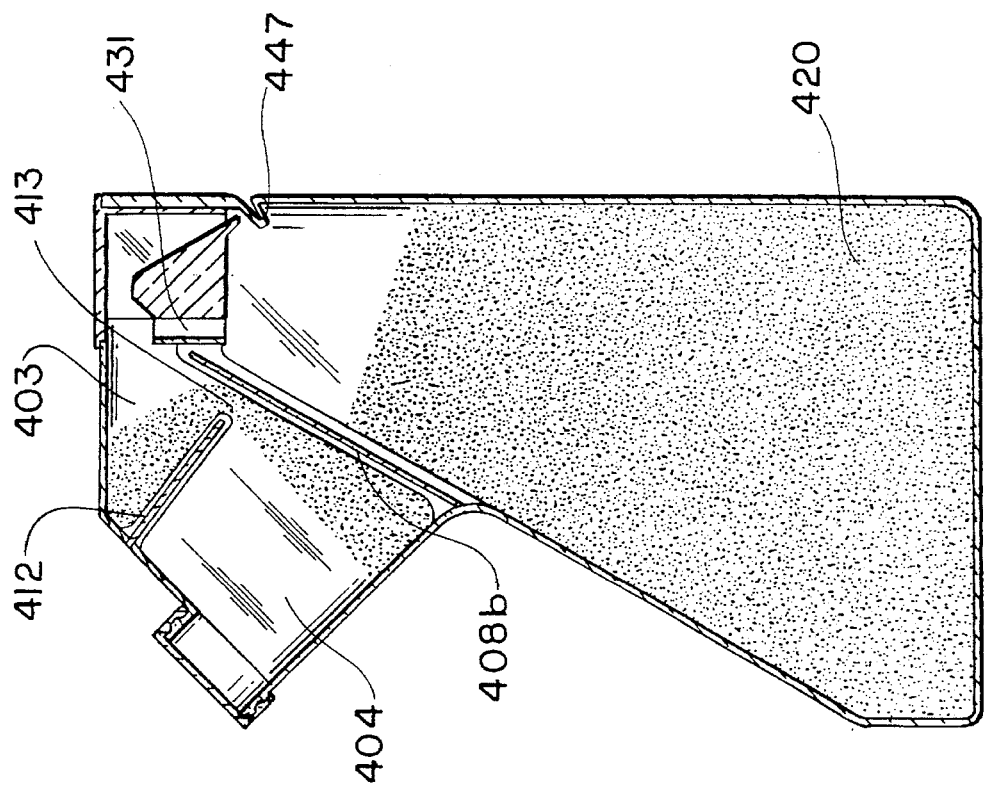
FIG. 52 is a view similar to FIG. 50 but shows the container in a second phase of operation.
Figure 55:
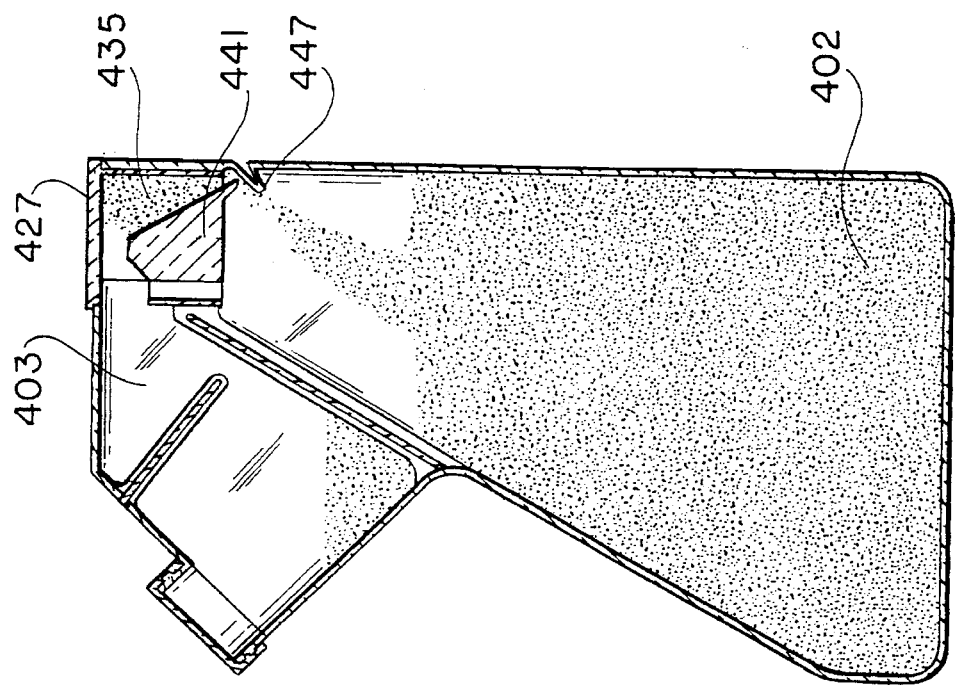
FIG. 55 is a view similar to FIG. 50 but shows the container in a fifth stage of operation.

When the first measuring chamber 403 has been filled as described in the preceding paragraph, the container is then returned by clockwise rotation from the position showing in FIG. 51 to that shown in FIG. 52 of the drawings. As shown in FIG. 52 of the drawings, material in the storage chamber 403 has fallen downwardly from the underside of the flange 447 and surplus material in the passage 431 has also returned to the storage chamber 402. The material remaining in the first measuring chamber 403 passes through the passage 413 between the extremity of the barrier 41 2 and the wall portion 408b of the container to enter the dispensing chamber 404. The conclusion of this stage in which the dispensing chamber is filled with the predetermined amount of material is shown in FIG. 53 of the drawings.

Figure 54:
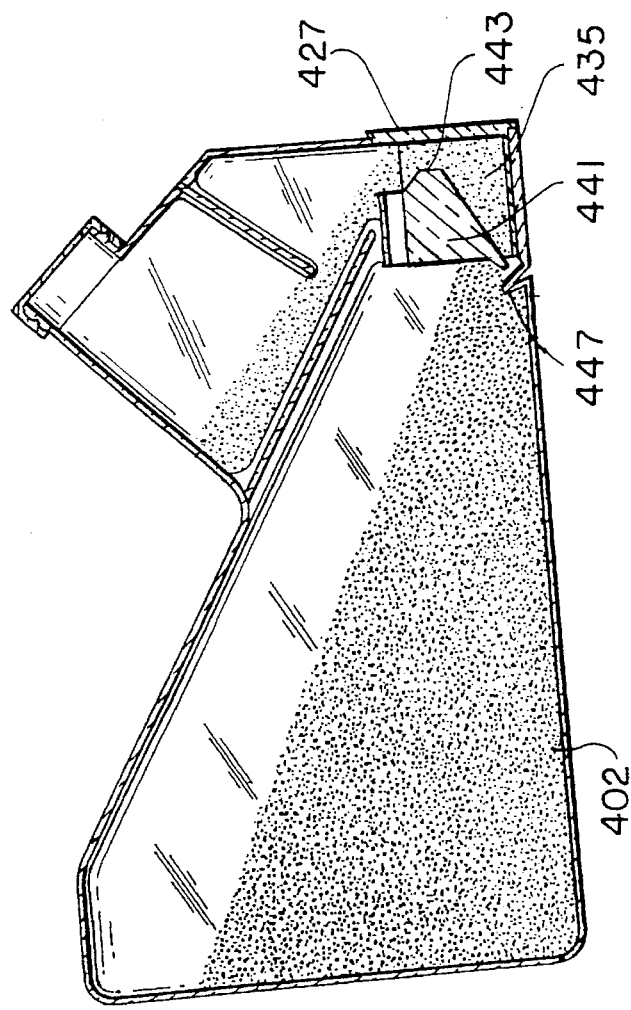
FIG. 54 shows the container in a position rotated in a clockwise direction during a fourth phase of operation.
Figure 56:
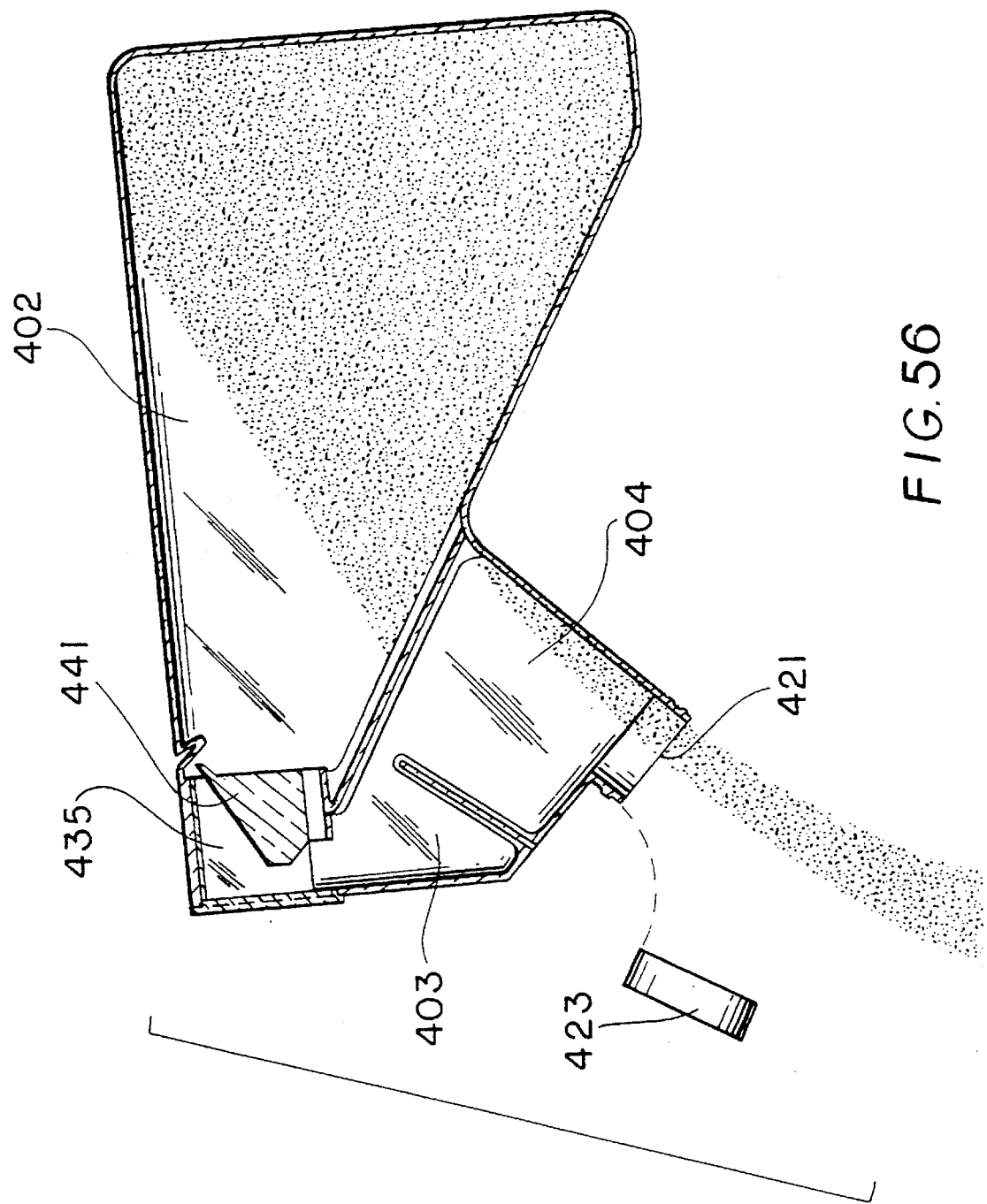
FIG. 56 is a view similar to FIG. 51 but shows the container in a final stage of operation.

As in the case of the embodiment described with reference to FIGS. 29 through 41 of the drawings, it may be desired to dispense less than all of the measured volume now occupying the dispensing chamber 404. This may be achieved by withdrawing a predetermined volume of material from that residing in the dispensing chamber and this is accomplished by rotating the container clockwise from the position shown in FIG. 53 of the drawings to that shown in FIG. 54 of the drawings. As shown in FIG. 54 of the drawings, when the container is so rotated, material will flow from the dispenser chamber 404 through the passage 413 over the apex 443 of the core 441 to enter and fill the second measuring chamber 435 within the plug 427. The angle of repose of the flowable material is such that, as shown FIG. 54 of the drawings, the material in the second measuring chamber 435 will not mingle with the material contained in the storage chamber 402 and a space between the two bodies of the material will exist in the region of the bottom extremity of the rear surface 446 of the core 441 and the flange 447. Thereafter, the container is returned to its initial upright position by rotation in a counterclockwise direction from the position shown in FIG. 54 to that shown in FIG. 55 whereupon the material within the second measuring chamber 435 will pour through the gap existing between the bottom end of the rear surface 446 of the core and the flange. 447 to be returned to the storage chamber 402. The remaining material which had not crossed the apex 443 of the core 441 again passes through the passage 413 and is returned to the dispensing chamber 404 from which it can then be dispensed by removal-of the cap 423 and orientation of the container in a counterclockwise direction to adopt the pouring position shown in FIG. 56 of the drawings.

As in the case of the embodiment shown in FIGS. 29 through 41 of the drawings, if the first measuring chamber 403 has a volume of 9 cubic centimeters and the volume of the second measuring chamber 435 is 3 cubic centimeters, it is possible to dispenser either 9 cubic centimeters, 6 cubic centimeters or 3 cubic centimeters. If, in such hypothetical example, it is desired to dispense only 3 cubic centimeters, then the second measuring chamber 435 would be filled twice from the dispensing chamber 404.

The embodiment shown in FIGS. 42 to 56 of the drawings has the advantage that the container 401, including the storage chamber 402, first measuring chamber 403 and dispensing chamber 404 can be molded as a unit whereas the plug can be separately manufactured to mate with the container and provide the desired first and second measuring chambers.

We claim:

1. A container for measuring and dispensing a predetermined amount of flowable solid material, said container including a storage chamber, a measuring chamber and a dispensing chamber, said measuring chamber communicating with said storage chamber in such manner as to be fillable with material from said storage chamber upon tilting of said container from an initial position to a tilted position to pour material from said storage chamber into said measuring chamber, said measuring chamber having a closed bottom and fixed wall portions which define a constant volume chamber, one of said wall portions providing a barrier separating said measuring chamber from said dispensing chamber, said barrier wall portion extending from said closed bottom upwardly to a passage which communicates with said dispensing chamber and which enables said measuring chamber to be completely filled substantially to the level of said passage when the container is in said tilted position, said measuring chamber communicating with said dispensing chamber by way of said passage in such manner that upon reversion of the container to said initial position material will transfer from the measuring chamber to the dispensing chamber and surplus material which had not entered the measuring chamber will return to the storage chamber and that the measuring chamber will not be refilled from the storage chamber upon further tilting of the container to dispense the measured volume from the dispensing chamber.

2. A container as claimed in claim 1, wherein the measuring and dispensing chambers are separated from the storage chamber by a wall portion of said storage chamber, and wherein an end extremity of said wall portion provides a weir over which material may be poured from the storage chamber to fill the measuring chamber.

3. A container as claimed in claim 2, wherein the weir is spaced from a top portion of the container to define a passage therebetween.

4. A container according to claim 2, wherein a filling passage extends downwardly into the storage chamber at a location proximate the weir, and wherein the weir and external surface of the filling passage define a passage providing communication between the storage chamber and the measuring chamber.

5. A container as claimed in claim 4, wherein the filling passage is closable by a plug.

6. A container as claimed in claim 4, wherein a second measuring chamber is disposed around the external periphery of the filling passage, said second measuring chamber being fillable from the dispensing chamber upon tilting upon said container beyond the initial position, and wherein the second measuring chamber is disposed to cooperate with the weir in such manner that, upon reverting the container to the initial position, the material within the second measuring chamber will be returned to the storage chamber and the remaining material will be returned to the dispensing chamber.

7. A container as claimed in claim 2, wherein the wall portion separating the measuring and dispensing chambers from the storage chamber is a front wall portion of the storage chamber.

8. A container as claimed in claim 7, wherein the measuring chamber and dispensing chamber are positioned side by side and are separated one from the other by the barrier wall portion, said barrier wall portion extending toward but terminating short of the front wall portion of the storage chamber to define, with said front wall portion, the communicating passage between the measuring and dispensing chambers.

9. A container as claimed in claim 8, wherein the section of the passage between the measuring chamber and the dispensing chamber is an elongated slot.

10. A container as claimed in claim 8, wherein the passage between the measuring chamber and the dispensing chamber has a height which is substantial in relation to the width.

11. A container as claimed in claim 10, when the section of the passage is substantially triangular.

12. A container as claimed in claim 8, wherein the container comprising the storage, measuring and dispensing chambers and barrier is a unitary molding of plastics material.

13. A container as claimed in claim 1, wherein the measuring chamber is substantially triangular in shape.

14. A container as claimed in claim 1, wherein a filling opening is provided in the upper portion of the storage chamber and a dispensing opening leads from the dispensing chamber.

15. A container as claimed in claim 14, wherein at least one of said openings is defined by a neck extending outwardly from the respective chamber.

16. A container as claimed in claim 15, wherein the neck is externally screw threaded to receive a mating cap.

17. A container as claimed in claim 1, wherein the measuring chamber is a first measuring chamber and may be tilted in a first direction from an initial position to pour material from said storage chamber into said first measuring chamber, and wherein a second measuring chamber communicates with the dispensing chamber and is fillable therefrom upon tilting of said container in a second direction opposite to said first direction beyond the initial position to pour material from the dispensing chamber to fill the second measuring chamber, the relative dispositions of said chambers being such that when the container is again returned to the initial position, the material filling the second measuring chamber will return directly to the storage chamber and the material initially in the dispensing chamber which had not entered the second measuring chamber returns to the dispensing chamber.

18. A container as claimed in claim 17, wherein a filling bore extends downwardly into the storage chamber and is closable by a hollow plug, said plug having an opening in a wall portion located for alignment with an opening in the bore wall to provide communication between the storage chamber and the first measuring chamber, wherein a passage within the hollow plug extends between the opening in the wall portion thereof and an opening in the plug bottom to provide communication between the storage chamber and the aligned openings in the filling bore and the plug wall portion, said first measuring chamber communicating with the storage chamber in such manner as to be fillable with material from said storage chamber through said passage and aligned openings upon tilting said container in the first direction, and wherein the second measuring chamber is located within the hollow plug.

19. A container as claimed in claim 18, wherein a core is located within the hollow plug to separate the second measuring chamber from the passage extending from the plug bottom to the opening in the wall portion, said core having an upper end over which material may pass to enter the upper end of said second measuring chamber and defining first and second openings through the plug bottom, said first opening providing communication between the storage chamber and the passage within the plug, and said second opening providing communication between the bottom of the second measuring chamber and the storage chamber.

20. A container as claimed in claim 19, wherein a flange projects inwardly from a wall portion of the storage chamber at a location proximate the inner end of the filling bore and wherein the bottom of the plug core cooperates with said inwardly projecting flange to define a restricted passage between the second measuring chamber and the storage chamber.

21. For use with a container according to claim 20, a cylindrical plug having a closed top and an internal core defining a passage on one side and a chamber on the other side, said passage and chamber each being accessible through respective openings in the bottom of the plug, said passage leading from the opening in the plug bottom to an opening extending through the plug cylindrical wall and said core terminating short of the closed plug top to provide communication between said opening through the plug cylindrical wall and the chamber.

22. A container as claimed in claim 1, wherein a filling bore extends downwardly into the storage chamber, said filling bore being located in the upper region of said storage chamber and proximate the measuring chamber and is closable by a plug.

23. A container as claimed in claim 22, wherein the plug is hollow and has an opening in a wall portion located for alignment with an opening in the bore wall to provide communication between the storage chamber and the measuring chamber.

24. A container as claimed in claim 24, wherein a passage within said hollow plug extends from the opening in the wall portion thereof and an opening in the plug bottom to provide communication between the storage chamber and the aligned openings in the filling bore and the plug wall portion.

25. A container as claimed in claim 24, wherein a second measuring chamber is located within the hollow plug and is separated from the passage extending from the plug bottom to the opening in the wall portion.

26. A container as claimed in claim 25, wherein a core is located within the hollow plug to separate the second measuring chamber from the passage, said core having an upper end over which material may pass to enter the upper end of said second measuring chamber and defining first and second openings through the plug bottom, said first opening providing communication between the storage chamber and the passage within the plug, and said second opening providing communication between the bottom of the second measuring chamber and the storage chamber.

27. A container as claimed in claim 26, wherein a flange projects inwardly from a wall portion of the storage chamber at a location proximate the inner end of the filling bore.

28. A container as claimed in claim 27 wherein the bottom of the plug core cooperates with the inwardly projecting flange to define a restricted passage between the second measuring chamber and the storage chamber.

29. A container as claimed in claim 28, wherein the plug core has a first wall portion spaced from and extending substantially parallel to the plug wall to define the passage leading to the wall opening and a second wall portion extending downwardly away from the upper end of the core to confine the second measuring chamber, whereby said second measuring chamber is substantially triangular in section.

30. A container as claimed in claim 29, wherein the first and second wall portions of the core diverge downwardly from an apex.

31. For measuring and dispensing a predetermined amount of flowable solid material, a container including a storage chamber, a first measuring chamber, a second measuring chamber and a dispensing chamber, said first measuring chamber communicating with the storage chamber in such manner as to be fillable with material from said storage chamber upon tilting said container in a first direction from an initial position to pour material from said storage chamber into said measuring chamber, said first measuring chamber having a closed bottom and fixed wall positions which define a constant volume chamber, one of said wall portions providing a barrier separating said first measuring chamber from said dispensing chamber, said barrier wall portion extending from said closed bottom upwardly to a passage communicating with said dispensing chamber and enabling said first measuring chamber to be completely filled substantially to the level of said passage when the container is tilted in said first direction, said first measuring chamber communicating with said dispensing chamber in such manner that upon reversion of the container to said initial position material will transfer from the first measuring chamber to the dispensing chamber and surplus material which had not entered the first measuring chamber will return to the storage chamber, and that the measuring chamber will not be refilled from the storage chamber upon further tilting of the container to dispense the measured volume from the dispensing chamber, and said second measuring chamber communicating with the dispensing chamber and being fillable therefrom upon tilting of said container in a second direction opposite to said first direction beyond the initial position to pour material from the dispensing chamber to fill the second measuring chamber, the relative dispositions of said chambers being such that when the container is again returned to the initial position the material filling the second measuring chamber will return directly to the storage chamber and the material initially in the dispensing chamber which had not entered the second measuring chamber returns to the dispensing chamber.

32. For measuring and dispensing a predetermined amount of flowable solid material, a container including a storage chamber, a first measuring chamber, a second measuring chamber, a dispensing chamber, a filling bore extending downwardly into the storage chamber and closable by a hollow plug, said plug having an opening in a wall portion located for alignment with an opening in the bore wall to provide communication between the storage chamber and the first measuring chamber and a passage within the hollow plug extending between the opening in the wall portion thereof and an opening in the plug bottom to provide communication between the storage chamber and the aligned openings in the filling bore and the plug wall portion, said first measuring chamber communicating with the storage chamber in such manner as to be fillable with material from said storage chamber through said passage and aligned openings upon tilting said container in a first direction from an initial position to pour material from said storage chamber into said first measuring chamber, said first measuring chamber having a closed bottom and fixed wall portions which define a constant volume chamber, one of said wall portions providing a barrier separating said first measuring chamber from said dispensing chamber, said barrier wall portion extending from said closed bottom upwardly to a passage communicating with said dispensing chamber and enabling said first measuring chamber to be completely filled substantially to the level of said communicating passage when the container is tilted in said first direction, said first measuring chamber communicating with said dispensing chamber in such manner that upon reversion of the container to said initial position material will transfer from the first measuring chamber to the dispensing chamber and surplus material which had not entered the first measuring chamber will return to the storage chamber, and that the measuring chamber will not be refilled from the storage chamber upon further tilting of the container to dispense the measured volume from the dispensing chamber, said second measuring chamber being located within the hollow plug and being fillable from the dispensing chamber upon tilting of said container in a second direction opposite to said first direction beyond the initial position to pour material from the dispensing chamber to fill the second measuring chamber, the relative dispositions of said chambers being such that when the container is again returned to the initial position, the material filling the second measuring chamber returns from the plug to the storage chamber and the material initially in the dispensing chamber which had not entered the second measuring chamber returns to said dispensing chamber.

\* \* \* \* \*